(12) United States Patent
Wang et al.

(10) Patent No.: US 10,019,360 B2
(45) Date of Patent: Jul. 10, 2018

(54) HARDWARE PREDICTOR USING A CACHE LINE DEMOTION INSTRUCTION TO REDUCE PERFORMANCE INVERSION IN CORE-TO-CORE DATA TRANSFERS

(71) Applicant: Intel Corporation, Santa Clara, CA (US)

(72) Inventors: Ren Wang, Portland, OR (US); Andrew J. Herdrich, Hillsboro, OR (US); Christopher B. Wilkerson, Portland, OR (US)

(73) Assignee: Intel Corporation, Santa Clara, CA (US)

(*) Notice: Subject to any disclaimer, the term of this patent is extended or adjusted under 35 U.S.C. 154(b) by 51 days.

(21) Appl. No.: 14/866,923

(22) Filed: Sep. 26, 2015

(65) Prior Publication Data

US 2017/0091090 A1    Mar. 30, 2017

(51) Int. Cl.

| G06F 12/08 | (2016.01) |
|---|---|
| G06F 12/12 | (2016.01) |
| G06F 12/0808 | (2016.01) |
| G06F 12/126 | (2016.01) |
| G06F 12/128 | (2016.01) |

(Continued)

(52) U.S. Cl.
CPC ........ *G06F 12/0808* (2013.01); *G06F 12/084* (2013.01); *G06F 12/0811* (2013.01); *G06F 12/0815* (2013.01); *G06F 12/0875* (2013.01); *G06F 12/126* (2013.01); *G06F 12/128* (2013.01); *G06F 2212/452* (2013.01); *G06F 2212/62* (2013.01)

(58) Field of Classification Search
CPC ............ G06F 12/0808; G06F 12/0811; G06F 12/0815; G06F 12/084; G06F 12/0875; G06F 12/128; G06F 12/126; G06F 2212/452; G06F 2212/62

See application file for complete search history.

(56) References Cited

U.S. PATENT DOCUMENTS

| 7,246,205 B2 * | 7/2007 | Balakrishnan ...... G06F 12/0888 710/18 |
|---|---|---|
| 2005/0086656 A1 * | 4/2005 | Whitlock ................. G06F 9/52 718/1 |

(Continued)

*Primary Examiner* — Glenn Gossage
(74) *Attorney, Agent, or Firm* — Nicholson De Vos Webster & Elliott LLP

(57) ABSTRACT

Apparatus and methods implementing a hardware predictor for reducing performance inversions caused by intra-core data transfer during inter-core data transfer optimization for network function virtualizations (NFVs) and other producer-consumer workloads. An apparatus embodiment includes a plurality of hardware processor cores each including a first cache, a second cache shared by the plurality of hardware processor cores, and a predictor circuit to track the number of inter-core versus intra-core accesses to a plurality of monitored cache lines in the first cache and control enablement of a cache line demotion instruction, such as a cache line LLC allocation (CLLA) instruction, based upon the tracked accesses. An execution of the cache line demotion instruction by one of the plurality of hardware processor cores causes a plurality of unmonitored cache lines in the first cache to be moved to the second cache, such as from L1 or L2 caches to a shared L3 or last level cache (LLC).

15 Claims, 20 Drawing Sheets

(51) Int. Cl.
    *G06F 12/0811*     (2016.01)
    *G06F 12/0815*     (2016.01)
    *G06F 12/084*     (2016.01)
    *G06F 12/0875*     (2016.01)

(56) References Cited

U.S. PATENT DOCUMENTS

| | | | | |
|---|---|---|---|---|
| 2009/0006755 | A1* | 1/2009 | Illikkal | G06F 11/3409 711/126 |
| 2009/0216950 | A1* | 8/2009 | McCalpin | G06F 12/0833 711/122 |
| 2010/0153649 | A1* | 6/2010 | Li | G06F 12/084 711/130 |
| 2012/0124292 | A1* | 5/2012 | Shum | G06F 12/0817 711/125 |
| 2014/0115256 | A1* | 4/2014 | Liu | G06F 12/0866 711/122 |
| 2014/0189297 | A1* | 7/2014 | Narvaez | G06F 9/45558 712/29 |
| 2015/0347299 | A1* | 12/2015 | Hagersten | G06F 12/0862 711/122 |
| 2016/0188474 | A1* | 6/2016 | Wang | G06F 12/0842 711/119 |

* cited by examiner

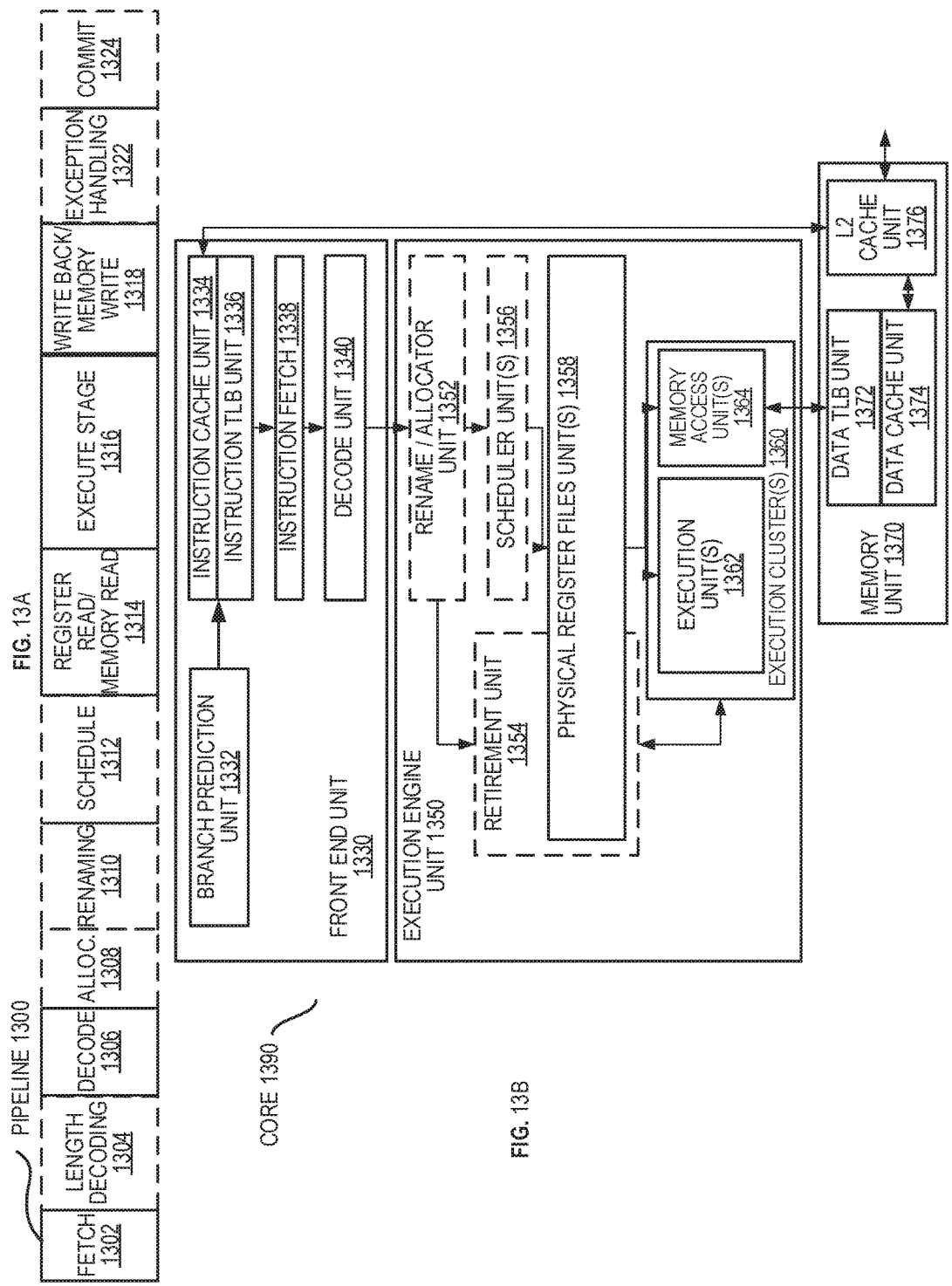

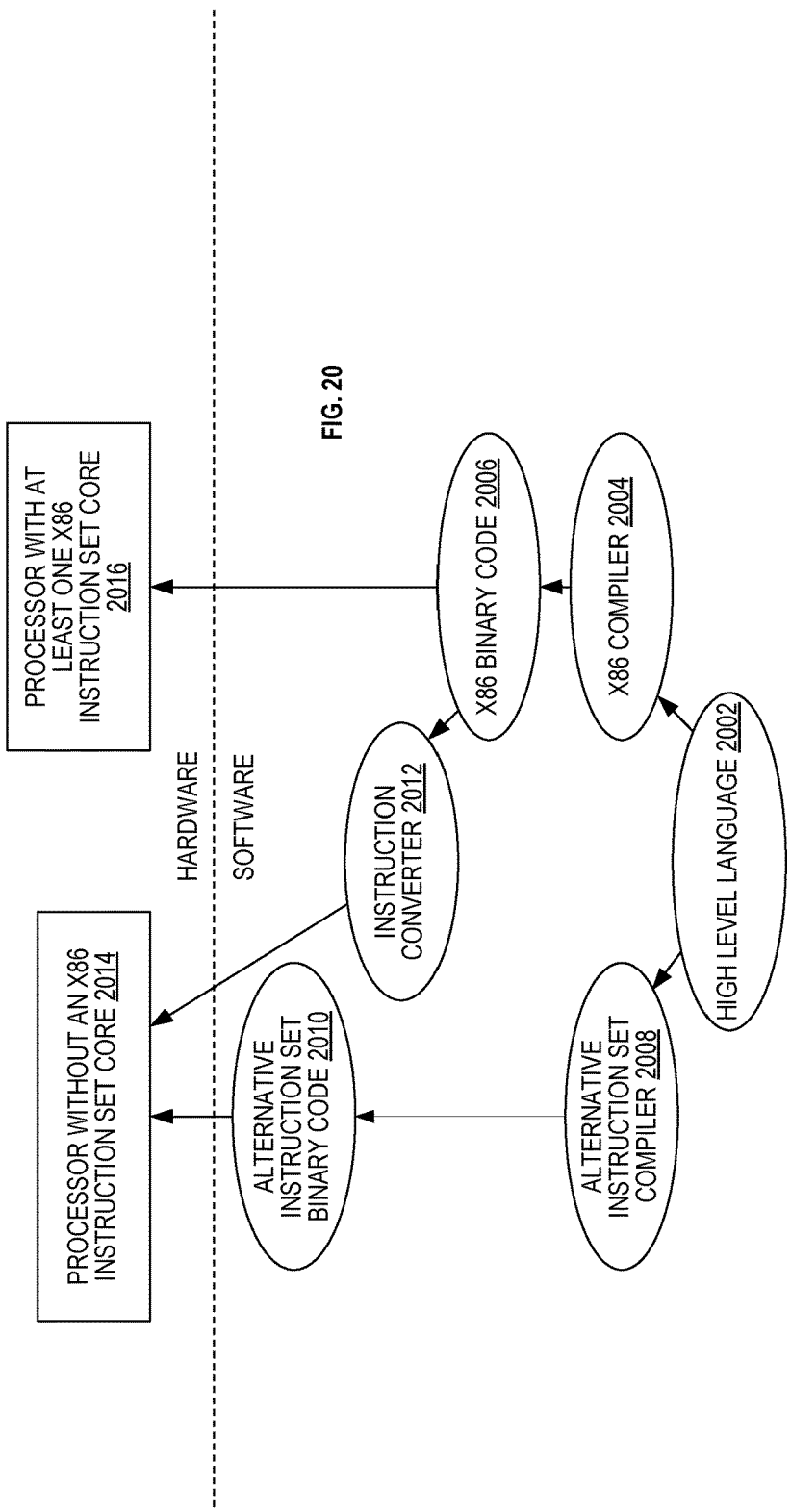

HARDWARE PREDICTOR USING A CACHE LINE DEMOTION INSTRUCTION TO REDUCE PERFORMANCE INVERSION IN CORE-TO-CORE DATA TRANSFERS

FIELD

Embodiments of the invention relate to the field of computer architecture, and more specifically, to data transfer.

BACKGROUND INFORMATION

Access to computer networks has become a ubiquitous part of today's computer usage. Whether accessing a Local Area Network (LAN) in an enterprise environment to access shared network resources, or accessing the Internet via the LAN or other access point, it seems users are always logged on to at least one service that is accessed via a computer network. Moreover, the rapid expansion of cloud-based services has led to even further usage of computer networks, and these services are forecast to become ever-more prevalent.

Networking is facilitated by various types of equipment including routers, switches, bridges, gateways, and access points. Large network infrastructure typically includes use of telecommunication-class network elements, including switches and routers made by companies such as Cisco Systems™, Juniper Networks™, Alcatel Lucent™, IBM™, and Hewlett-Packard™. Such telecom switches are very sophisticated, operating at very-high bandwidths and providing advanced routing functionality as well as supporting different Quality of Service (QoS) levels. Private networks, such as Local area networks (LANs), are most commonly used by businesses and home users. It is also common for many business networks to employ hardware- and/or software-based firewalls and the like.

In recent years, virtualization of computer systems has seen rapid growth, particularly in server deployments and data centers. Under a conventional approach, a server runs a single instance of an operating system directly on physical hardware resources, such as the central processing unit (CPU), random access memory (RAM), storage devices (e.g., hard disk), network controllers, input/output (I/O) ports, etc. Under one virtualized approach using Virtual Machines (VMs), the physical hardware resources are employed to support corresponding instances of virtual resources, such that multiple VMs may run on the server's physical hardware resources, wherein each virtual machine includes its own CPU allocation, memory allocation, storage devices, network controllers, I/O ports etc. Multiple instances of the same or different operating systems then run on the multiple VMs. Moreover, through use of a virtual machine manager (VMM) or "hypervisor," the virtual resources can be dynamically allocated while the server is running, enabling VM instances to be added, shut down, or repurposed without requiring the server to be shut down. This provides greater flexibility for server utilization, and better use of server processing resources, especially for multi-core processors and/or multi-processor servers.

Under another virtualization approach, container-based operating system (OS) virtualization is used that employs virtualized "containers" without use of a VMM or hypervisor. Instead of hosting separate instances of operating systems on respective VMs, container-based OS virtualization shares a single OS kernel across multiple containers, with separate instances of system and software libraries for each container. As with VMs, there are also virtual resources allocated to each container.

Deployment of Software Defined Networking (SDN) and Network Function Virtualization (NFV) has also seen rapid growth in the past few years. Under SDN, the system that makes decisions about where traffic is sent (the control plane) is decoupled from the underlying system that forwards traffic to the selected destination (the data plane). SDN concepts may be employed to facilitate network virtualization, enabling service providers to manage various aspects of their network services via software applications and APIs (Application Program Interfaces). Under NFV, by virtualizing network functions as software applications, network service providers can gain flexibility in network configuration, enabling significant benefits including optimization of available bandwidth, cost savings, and faster time to market for new services.

Today there are large amounts of proprietary network appliances that make additions and upgrades more and more difficult. Such network appliances include routers, firewalls, etc. which maintain real-time state of subscriber mobility, voice and media calls, security, contextual content management, etc. NFV technology consolidates these network functions onto general purpose X86 servers and can greatly reduce the configuration and upgrading complexity.

When several NFVs are consolidated, e.g., implemented as a set of Virtual Machines (VM) in one platform, it requires very efficient network packet handing due to the nature of the workloads and the high line-rate of current (10 Gigabits per second (Gbps)) and future (40 Gbps and 100 Gbps) network interfaces. On a multicore X86 server, those packets are forwarded (via inter-VM communication) and processed by NFV modules in VMs on different cores.

Under recent testing of a conventional implementation, it has been observed that the packet throughput of inter-VM communication, especially for small packets (e.g., 64 byte (B), which is important to telecommunication companies) are far from satisfactory. There are several performance bottlenecks, in terms of both software and hardware inefficiencies.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 13A is a block diagram illustrating both an exemplary in-order pipeline and an exemplary register renaming, out-of-order issue/execution pipeline according to embodiments of the invention.

FIG. 13B is a block diagram illustrating both an exemplary embodiment of an in-order architecture core and an exemplary register renaming, out-of-order issue/execution architecture core to be included in a processor according to embodiments of the invention.

FIG. 20 is a block diagram contrasting the use of a software instruction converter to convert binary instructions in a source instruction set to binary instructions in a target instruction set according to embodiments of the invention.

DETAILED DESCRIPTION

Figure 1:
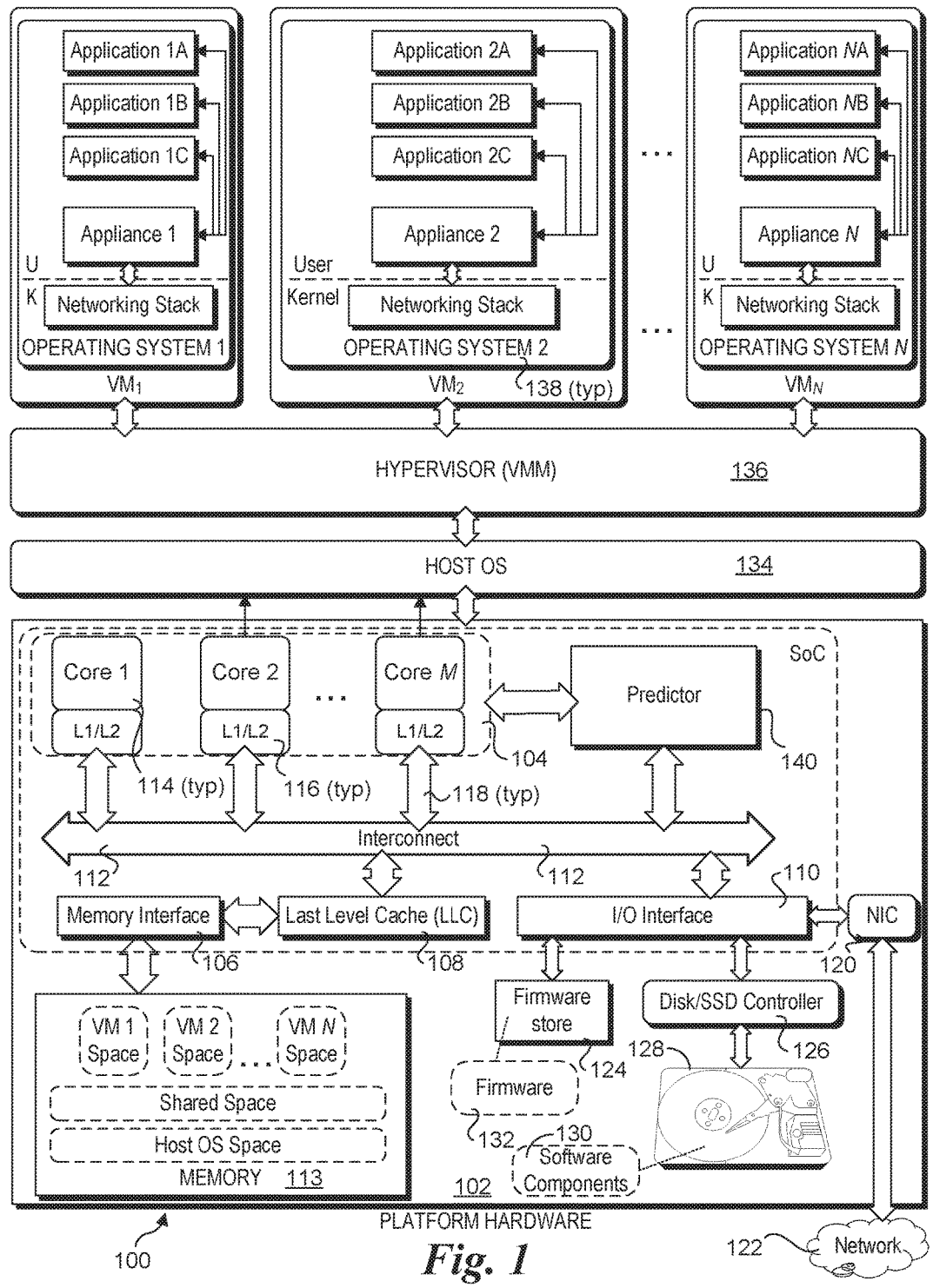
FIG. 1 is a schematic diagram illustrating an exemplary host platform configuration including platform hardware and various software-based components including NFV components.

Embodiments of apparatus and methods implementing a hardware predictor for reducing performance inversions caused by intra-VM data transfer during inter-VM data transfer optimization for NFVs and other producer-consumer workloads are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

As used herein, the terms "virtual appliance," "virtual network appliance," "network appliance," or simply "appliance" may be used interchangeably. In addition, for the purpose herein, including the claims, any software-based appliance relating to Software Defined Networking or configured to implement Network Function Virtualization may more generally be referred to as a "virtual appliance," with the understanding that virtual network appliances include any network appliance or virtualized entity that is configured to implement Network Function Virtualization and/or operations relating to Software Defined Networking. Accordingly, the terms virtual appliance in the following description includes all NFV appliances, as well.

FIG. 1 shows an exemplary host platform configuration 100 including platform hardware 102 and various software-based components including NFV components. Platform hardware 102 includes a central processing unit (CPU) 104 coupled to a memory interface 106, a last level cache (LLC) 108, an input/output (I/O) interface 110, and a predictor 140 via an interconnect 112. In some embodiments, all or a portion of the foregoing components may be integrated on a System on a Chip (SoC). Memory interface 106 is configured to facilitate access to system memory 113, which will usually be separate from the SoC.

CPU 104 includes a core portion including M processor cores 114, each including a local level 1 (L1) and level 2 (L2) cache 116. Optionally, the L2 cache may be referred to as a "middle-level cache" (MLC). As illustrated, each processor core 114 has a respective connection 118 to interconnect 112 and operates independently from the other processor cores.

For simplicity, interconnect 112 is shown as a single double-ended arrow representing a single interconnect structure; however, in practice, interconnect 112 is illustrative of one or more interconnect structures within a processor or SoC, and may comprise a hierarchy of interconnect segments or domains employing separate protocols and including applicable bridges for interfacing between the interconnect segments/domains. For example, the portion of an interconnect hierarchy to which memory and processor cores are connected may comprise a coherent memory domain employing a first protocol, while interconnects at a lower level in the hierarchy will generally be used for I/O access and employ non-coherent domains. The interconnect structure on the processor or SoC may include any existing interconnect structure, such as buses and single or multi-lane serial point-to-point, ring, or mesh interconnect structures.

I/O interface 110 is illustrative of various I/O interfaces provided by platform hardware 102. Generally, I/O interface 110 may be implemented as a discrete component (such as an ICH (I/O controller hub) or the like), or it may be implemented on an SoC. Moreover, I/O interface 110 may also be implemented as an I/O hierarchy, such as a Peripheral Component Interconnect Express (PCIe™) I/O hierarchy. I/O interface 110 further facilitates communication between various I/O resources and devices and other platform components. These include a Network Interface Controller (NIC) 120 that is configured to facilitate access to a network 122, and various other I/O devices, which include a firmware store 124, a disk/SSD controller 126, and a disk drive 128. More generally, disk drive 128 is representative of various types of non-volatile storage devices, including both magnetic- and optical-based storage devices, as well as solid-state storage devices, such as solid state drives (SSDs) or Flash memory.

The multiple cores 114 of CPU 104 are employed to execute various software components 130, such as modules and applications, which are stored in one or more non-volatile storage devices, such as depicted by disk drive 128. Optionally, all or a portion of software components 130 may be stored on one or more storage devices (not shown) that are accessed via a network 122

During boot up or run-time operations, various software components 130 and firmware 132 are loaded into system memory 113 and executed on cores 114 as processes comprising execution threads or the like. Depending on the particular processor or SoC architecture, a given "physical" core may be implemented as one or more logical cores, with processes being allocated to the various logical cores. For example, under the Intel® Hyperthreading™ architecture, each physical core is implemented as two logical cores.

Under a typical system boot for platform hardware 102, firmware 132 will be loaded and configured in system memory 113, followed by booting a host operating system (OS) 134. Subsequently, a hypervisor 136 (or VMM), which may generally comprise an application running on host OS 134, will be launched. Hypervisor 136 may then be employed to launch various virtual machines, VM1-N, each of which will be configured to use various portions (i.e., address spaces) of system memory 113. In turn, each virtual machine $VM_{1-N}$ may be employed to host a respective operating system $138_{1-N}$.

During run-time operations, hypervisor 136 enables reconfiguration of various system resources, such as system memory 113, cores 114, and disk drive(s) 128. Generally, the virtual machines provide abstractions (in combination with hypervisor 136) between their hosted operating system and the underlying platform hardware 102, enabling the hardware resources to be shared among VM1-N. From the viewpoint of each hosted operating system, that operating system "owns" the entire platform, and is unaware of the existence of other operating systems running on virtual machines. In reality, each operating system merely has access to only the resources and/or resource portions allocated to it by hypervisor 136.

As further illustrated in FIG. 1, each operating system includes a kernel space and a user space, both of which are implemented as memory spaces in system memory 113. The kernel space is protected and used to run operating system kernel components, including a networking stack. Optionally, the networking stack will be in the user space. Meanwhile, an operating system's user space is used to run user applications, as depicted by Appliances 1, 2, and N, and Applications 1A-C, 2A-C, and NA-C.

Generally, Appliances 1, 2, and N are illustrative of various SDN or NFV appliances that may run on virtual machines on platform hardware 102. For simplicity, each virtual machine $VM_{1-N}$ is depicted as hosting a similar set of software applications; however, this is merely for illustrative purposes, as the VMs for a given platform may host similar applications, or may host different applications. Similarly, each virtual machine $VM_{1-N}$ may host a single virtual network appliance (as shown), may host multiple virtual network appliances, or may not host any virtual network appliances.

Under SDN on a virtualized platform, data is passed between VMs over a virtual network. Generally, this may be implemented via virtual NICs for each VM, and a virtual switch in the hypervisor or VMM. Under a non-optimized conventional approach, the virtual switch is actually implemented in a manner similar to a physical switch, meaning the virtual switch includes input and output buffers and performs various packet flow operations. As with a physical switch, there are latencies that occur with each step of the data transfer sequence between the virtual NICs, which results in a substantial downgrade in performance.

In a virtualized environment including multiple VMs hosted on the same physical machine, the medium of communication is the memory subsystem. Therefore, expecting a very high throughput performance from the linkage of these VMs is not unrealistic. However, measurements from VMs on a typical modern server using a multitude of virtualization software reveals that the inter-VM communication performance is nowhere near what the memory subsystem could potentially achieve in terms of data throughput. For example, cloud workloads usually achieve a packet transfer rate of around one million packets per second between two VMs. Telco workloads, which typically use highly optimized software stacks and libraries, can usually achieve packet transfer rates of about ten million packets per second between two VMs.

Figure 2:
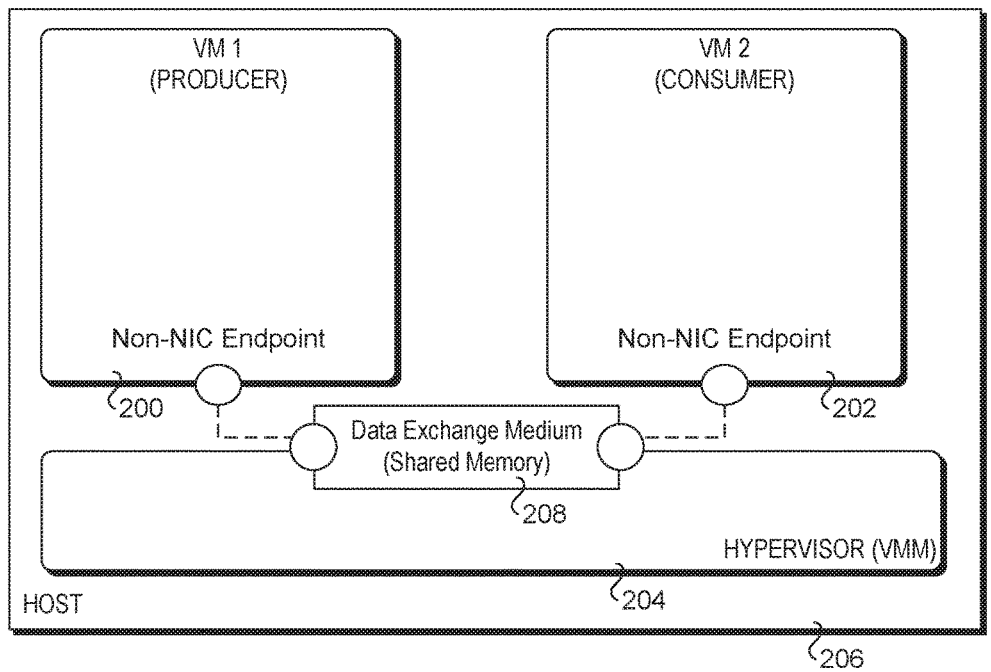
FIG. 2 is a schematic diagram illustrating a producer-consumer model employing shared memory.

The most efficient inter-VM solution currently in the art relies on a shared memory as the data medium for packet communication, as shown in FIG. 2, which depicts a pair of VMs 200 and 202 and a hypervisor 204 running on a host platform 206. VM1 200 is a producer, which writes a packet into the shared memory, which comprises data exchange medium 208, while the VM2 202 is a consumer that reads the packet from the shared memory. In order to keep data correctness, there is also a "ready" flag (not shown) used to guarantee the producer and consumer do not over-run each other.

As mentioned above, there is a lot of VM and network stack related software overhead involved in this case that prevents the packet throughput from reaching the bandwidth upper bound of the host platform's memory system. In order to separate the pure software overhead (which could eventually be addressed by many ongoing software optimization efforts), an instructions per cycle (IPC) memory benchmark was used to emulate the inter-VM packet communication in terms of memory access behaviors to study the hardware bottlenecks.

The benchmark that was used for the emulation is called mempipe-spin (Smith et al., Draft: Have you checked your IPC performance lately?, USENIX 2012, pp. 1-6). Its data-path behavior mimics the inter-VM communication described above, minus the VM overheads, with shared ring memory for producer thread and consumer thread, and a ready flag that needs to be checked before read or write operation. The consumer uses a pull mode to check if the flag is ready, which is very similar to the pull model used in data plane development kit (DPDK) packet processing.

Figure 3:
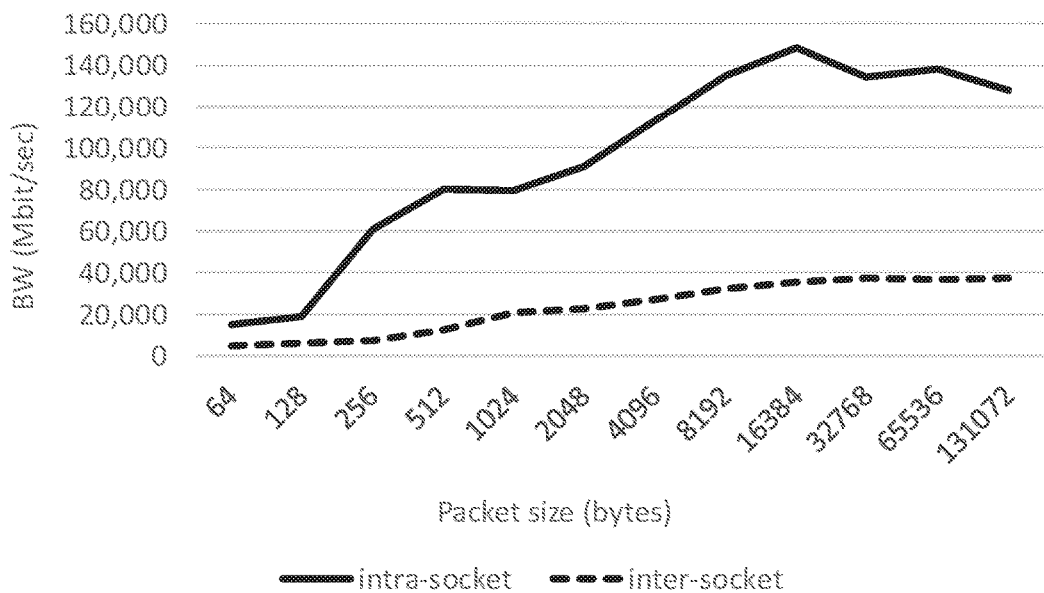
FIG. 3 is a graph comparing data transfer bandwidths for intra-socket and inter-socket communications.

FIG. 3 shows the throughput performance of mempipe-spin, with 2 threads running on 2 cores within a socket, and also 2 threads running on different sockets. From FIG. 3, we have two main observations. First, the throughput for communications within the socket (intra-socket), especially with smaller packet size, is far from the physical bandwidth limitation. Second, when the producer and consumer are on different sockets (inter-socket), the throughput performance becomes much worse.

During a producer-consumer data transfer, a first thread running on the producer writes a chunk of data (also referred to as a data object), which is then read by one or more other threads (depending on the number of consumers and the software architecture). When the data exchange medium is shared memory, on an abstract level this involves the producer writing data into a location in shared memory (e.g., at an address at which the data object is stored), and the consumer thread(s) accessing that location in shared memory. Easy and straightforward; that is, until you consider that the shared memory location may be replicated across different locations in system memory and various caches.

To illustrate this, we'll start off with a simple example illustrating a software application comprising a producer accessing data so that the software application can modify the data prior to sending it to a consumer. This is shown in FIG. 4a, which shows further detail to the platform hardware and software architectures depicted in FIG. 1.

In virtualized environments employing many VMs, it is a preferred practice to allocate a physical or logical processor core to each VM. This enables multiple threads corresponding to given guest operating system processes and applications running on the guest OS to be executed on the same core. It also significantly improves memory accesses via the use of L1 and L2 caches for the core, as will become more evident below. Accordingly, in some of the Figures herein, VMs are shown as running on respective cores, recognizing that there may be instances in which a single core may host multiple VMs. While it is possible for the processes for a single VM to run on multiple cores (e.g., for a personal computer running a single VM such as an Apple Macintosh™ computer running a VM hosting a Microsoft Windows™ OS), that is not a likely usage scenario in SDN and NFV deployments.

As illustrated, each of the cores $114_1$ and $114_2$ include a respective L1 cache $116_1$ and $116_2$, and a respective L2 cache $118_1$ and $118_2$, each including multiple cache lines depicted as rectangular blocks. LLC 108 includes a set of LLC cache lines stored in cache line slots 430, and system memory 113 likewise includes or stores multiple cache lines, including a set of memory cache lines 426 corresponding to a portion of shared space 406.

Figure 4A:
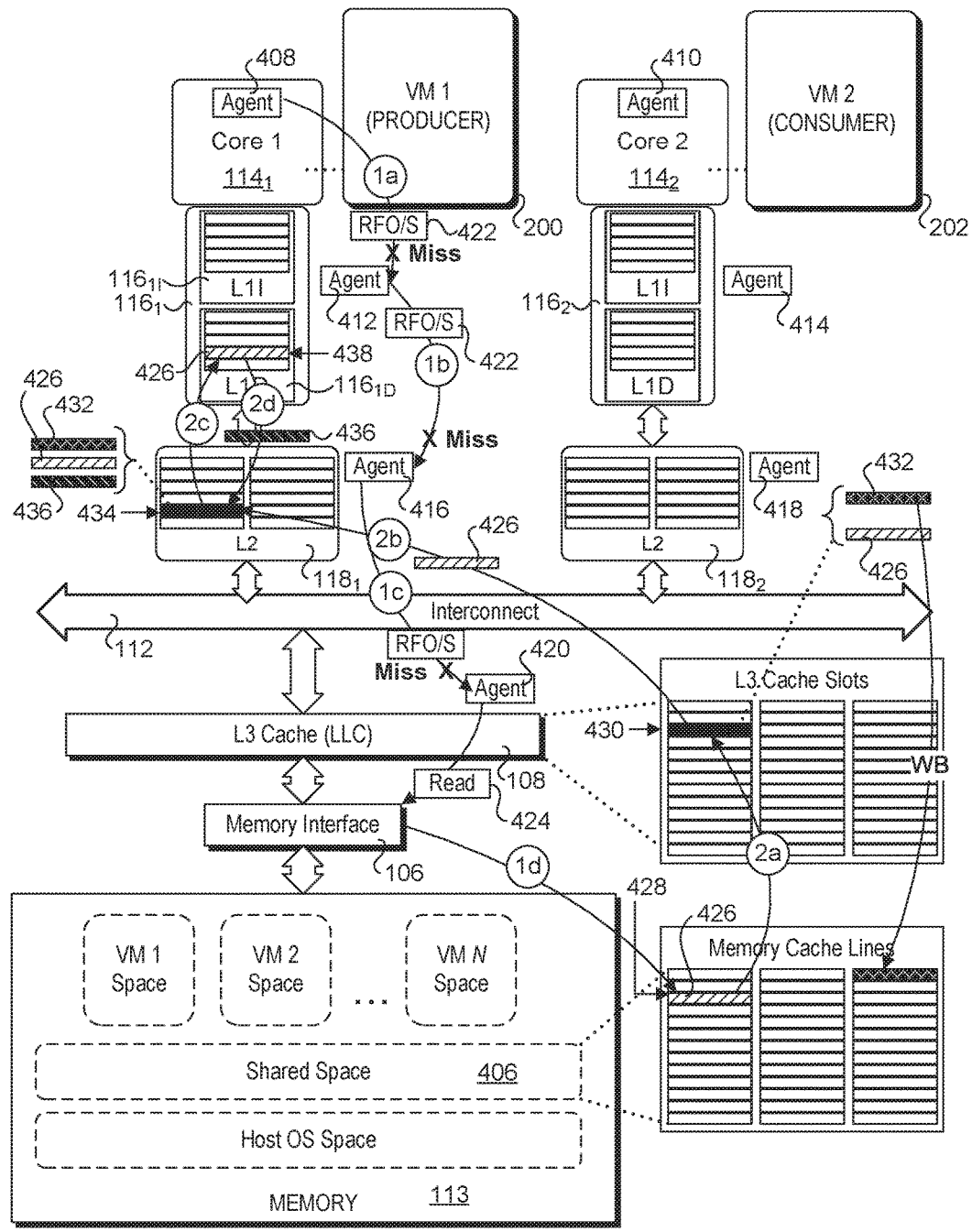
FIG. 4a is a schematic diagram illustrating access of a cache line by a producer application that is not currently stored in any cache level and is accessed from system memory, under a conventional approach.
Figure 4B:
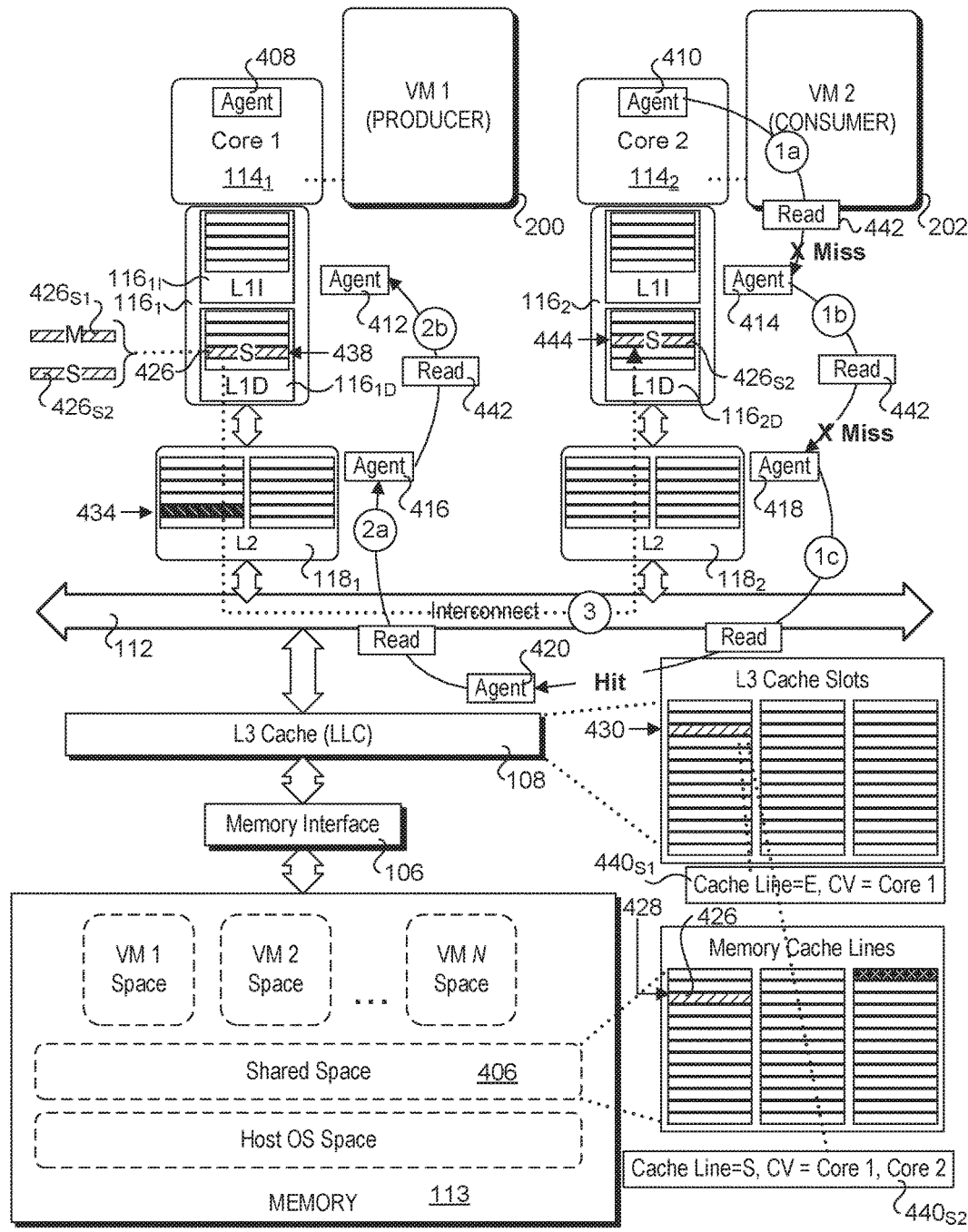
FIG. 4b is a schematic diagram illustrating a consumer application retrieving the cache line from an L1 cache of a core executing the producer application, under a conventional approach.
Figure 5:
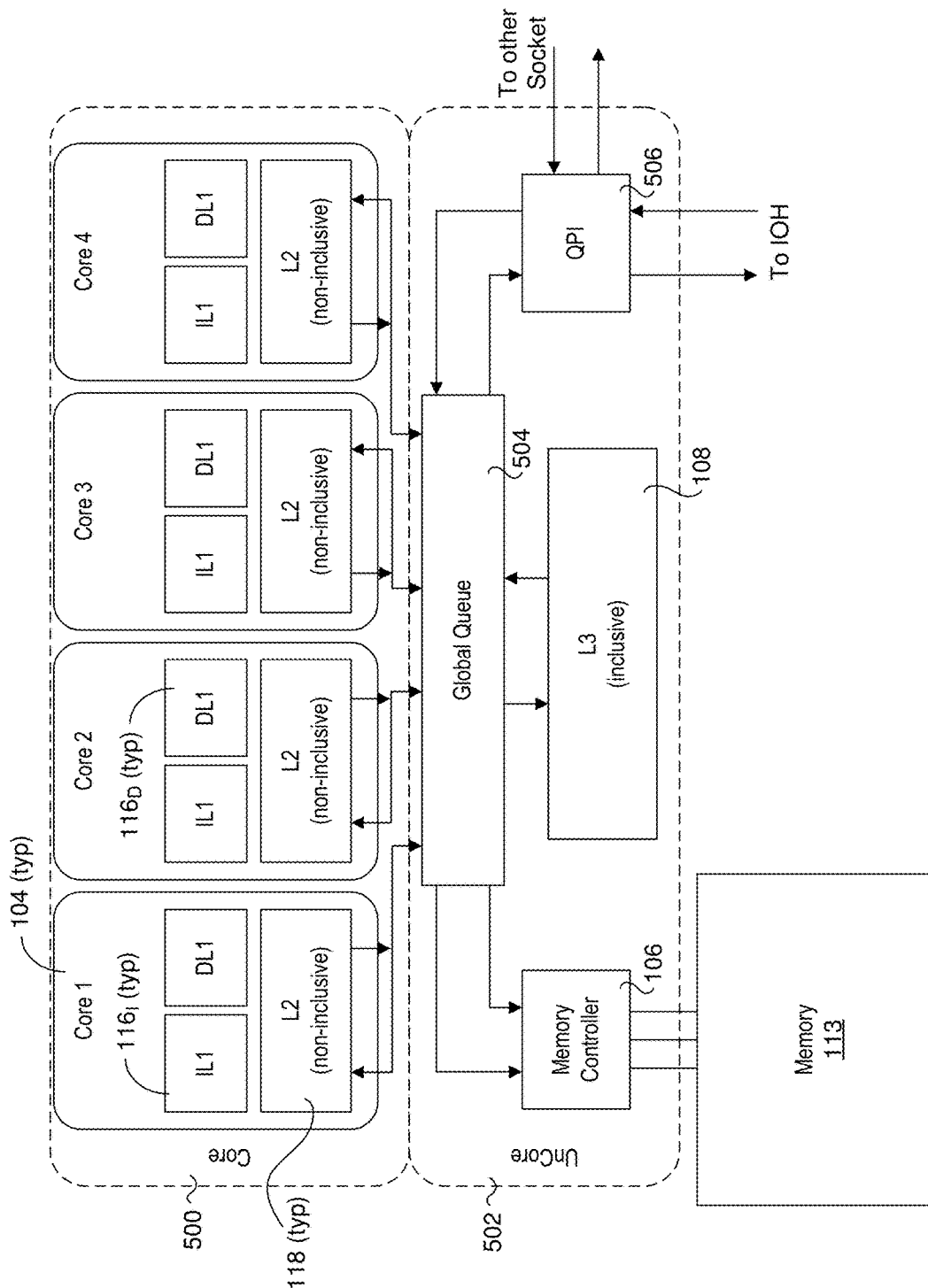
FIG. 5 is a schematic diagram illustrating an abstracted view of a memory coherency architecture employed by the platform shown in FIGS. 4a and 4b.

FIG. 5 shows an abstracted view of a memory coherency architecture employed by the platform of FIGS. 4a and 4b. Under this and similar architectures, such as employed by many Intel® processors, the L1 and L2 caches are part of a coherent memory domain under which memory coherency is managed by coherency mechanisms in the processor core 500. Each core 104 includes a L1 instruction (IL1) cache 116I, and L1 data cache (DL1) 116D, and an L2 cache 118.

L2 caches 118 are depicted as non-inclusive, meaning they do not include copies of any cache lines in the L1 instruction and data caches for their respective cores. As an option, L2 may be inclusive of L1, or may be partially inclusive of L1. In addition, L3, which is shown as inclusive in FIG. 5, may be non-inclusive of L2. As yet another option, L1 and L2 may be replaced by a cache occupying a single level in cache hierarchy.

Meanwhile, the LLC is considered part of the "uncore" 502, wherein memory coherency is extended through coherency agents, resulting in additional overhead and processor cycles. As shown, uncore 502 includes memory controller 106 coupled to external memory 113 and a global queue 504. Global queue 504 also is coupled to an L3 cache 108, and a QuickPath Interconnect® (QPI) interface 506. Optionally, interface 506 may comprise a Keizer Technology Interface® (KTI). L3 cache 108 (which functions as the LLC in this architecture) is inclusive, meaning that it includes a copy of each cache line in the L1 and L2 caches.

As is well known, as you get further away from a core, the size of the cache levels increases, but so does the latency incurred in accessing cache lines in the caches. The L1 caches are the smallest (e.g., 32-64 KiloBytes (KB)), with L2 caches being somewhat larger (e.g., 256-640 KB), and LLCs being larger than the typical L2 cache by an order of magnitude or so (e.g., 8-16 MegaBytes (MB)). Of course, the size of these caches is dwarfed by the size of system memory (on the order of GigaBytes (GB)). Generally, the size of a cache line at a given level in a memory hierarchy is consistent across the memory hierarchy, and for simplicity and historical references, lines of memory in system memory are also referred to as cache lines even though they are not actually in a cache. It is further noted that the size of global queue 504 is quite small, as it is designed to only momentarily buffer cache lines that are being transferred between the various caches, memory controller 106, and QPI interface 506.

Returning to FIG. 4a, multiple cache agents are used to exchange messages and transfer data in accordance with a cache coherency protocol. The agents include core agents 408 and 410, L1 cache agents 412 and 414, L2 cache agents 416 and 418, and an L3 cache agent 420.

FIG. 4a illustrates a simple memory access sequence in which a cache line is accessed from system memory and copied into L1 cache $116_1$ of core $114_1$. Data in system memory is stored in memory blocks (also referred to by convention as cache lines as discussed above), and each memory block has an associated address, such as a 64-bit address for today's 64-bit processors. From the perspective of applications, which includes the producers and consumers, a given chunk of data (data object) is located at a location in system memory beginning with a certain memory address, and the data is accessed through the application's host OS. Generally, the memory address is actually a virtual memory address, and through some software and hardware mechanisms, such virtual addresses are mapped to physical addresses behind the scenes. Additionally, the application is agnostic to whether all or a portion of the chunk of data is in a cache. On an abstract level, the application will ask the operating system to fetch the data (typically via address pointers), and the OS and hardware will return the requested data to the application. Thus, the access sequence will get translated by the OS as a request for one or more blocks of memory beginning at some memory address which ends up getting translated (as necessary) to a physical address for one or more requested cache lines.

In FIG. 4a, the access sequence would begin with core 114$_1$ sending out a Read for Ownership (RFO) message and first "snooping" (i.e., checking) its local L1 and L2 caches to see if the requested cache line is currently present in either of those caches. In this example, producer 200 desires to access the cache line so its data can be modified, and thus the RFO is used rather than a Read request. The presence of a requested cache line in a cache is referred to as a "hit," while the absence is referred to as a "miss." This is done using well-known snooping techniques, and the determination of a hit or miss for information maintained by each cache identifying the addresses of the cache lines that are currently present in that cache. As discussed above, the L2 cache is non-inclusive, making the L1 and L2 caches exclusive, meaning the same cache line will not be present in both of the L1 and L2 caches for a given core. Under operation 1a, core agent 408 sends an RFO message with snoop (RFO/S) 422 to L1 cache agent 412, which results in a miss. During operation 1b, L1 cache agent 412 forwards the RFO/snoop message 422 to L2 cache agent 416, resulting in another miss.

In addition to snooping a core's local L1 and L2 caches, the core will also snoop L3 cache 108. If the processor employs an architecture under which the L3 cache is inclusive, meaning that a cache line that exists in L1 or L2 for any core also exists in the L3, the core knows the only valid copy of the cache line is in system memory if the L3 snoop results in a miss. If the L3 cache is not inclusive, additional snoops of the L1 and L2 caches for the other cores may be performed. In the example of FIG. 4a, during operation 1c, L2 agent 416 forwards RFO/snoop message 422 to L3 cache agent 420, which also results in a miss. Since L3 is inclusive, it does not forward RFO/snoop message 422 to cache agents for other cores.

In response to detecting that the requested cache line is not present in L3 cache 108, L3 cache agent 420 sends a Read request 424 to memory interface 106 to retrieve the cache line from system memory 113. This retrieval is depicted by operation 1d which accesses cache line 426 stored at a memory address 428. Then, as depicted by a copy operation 2a, the Read request results in cache line 426 being copied into a cache line slot 430 in L3 cache 108. Presuming that L3 is full, this results in eviction of a cache line 432 that currently occupies slot 430. Generally, the selection of the cache line to evict (and thus determination of which slot in the cache data will be evicted from and written to) will be based on one or more cache eviction algorithms that are well-known in the art. If cache line 432 is in a modified state, cache line 432 will be written back to memory 113 (known as a cache write-back) prior to eviction, as shown. As further shown, there was a copy of cache line 432 in a slot 434 in L2 cache 118$_1$, which frees this slot. Cache line 426 is also copied to slot 434 during an operation 2b.

Next, cache line 426 is to be written to L1 data cache 116$_{1D}$. However, this cache is full, requiring an eviction of one of its cache lines, as depicted by an eviction of a cache line 436 occupying a slot 438. This evicted cache line is then written to slot 434, effectively swapping cache lines 426 and 436, as depicted by operations 2c and 2d. At this point, cache line 426 may be accessed (aka consumed) by core 114$_1$.

Oftentimes, as described above with reference to FIG. 2, a first NFV appliance (the producer) will generate data corresponding to a first object (e.g., modify the first object), and subsequently a second NFV appliance (the consumer) will want to access the object. In one case, multiple NFV appliances may want to simply read that same object's data. An illustration of an example of how this is done under a conventional approach is shown in FIG. 4b.

At the start of the process, there are three copies of cache line 426—one in memory 113, one in slot 430 of L3 cache 108 and the other in slot 438 of L1 data cache 1161D. Cache line 426 holds data corresponding to a data object. (For simplicity, only a single cache line is shown; in practice, the data for a data object will generally span multiple cache lines.) The consumer, executing on Core 2, desires to access the data object, which it knows is located at memory address 428 (per corresponding software object code executing on Core 2).

As further depicted in FIG. 4b, L3 cache agent 420 maintains information of each cache line it stores relating to the state of the cache line and which cores have copies of the cache line. In one embodiment, core valid (CV) bits are used to indicate which core(s) have a valid copy of the cache line. When cache line 426 is copied to L3 cache 108, its cache line status data is set to indicate that cache line 426 is in the (E)xclusive state, and the CV bits indicate Core 1 has the only valid copy of the cache line, as depicted by cache line status data 440$_{S1}$. Subsequently, producer 200 modifies the data object, resulting in the state of cache line 426 being updated to (M)odified state 426$_{S1}$. In accordance with conventional cache coherency schemes and cache eviction policies, the modified copy of the cache line is not written to L3 cache 108 at this point.

Core 2 agent 410, will send out a Read request 442 along with a cache snoop to determine whether cache line 426 is present in its L1 data cache 116$_{2D}$ or L2 cache 118$_2$, or in L3 cache 108. As depicted by operation 1a, core agent 410 sends a first cache snoop to L1 cache agent 414 requesting access to cache line 426 (e.g., Read request 422), resulting in a miss. The snoop is forwarded to L2 cache agent 418, as depicted by operation 1b, resulting in a second miss. As before, the Read request message with snoop is forwarded from the L2 cache agent (418) to L3 cache agent 420, as depicted by operation 1c.

L3 cache agent 420 checks to see if a copy of cache line 426 is present in L3 cache 108, resulting in a hit. L3 cache agent 420 the checks cache line status data 440$_{S1}$ and determines the Core 1 has exclusive ownership of cache line 426. Since a cache line in an exclusive state can be modified by its owner, it is possible that cache line 426 has been modified (in this case it has), and thus the copy of cache line 426 held by L3 cache 108 is not current. Accordingly, L3 cache agent 420 sends the read request to the L1 and L2 cache agents for Core 1, as depicted by operations 2a and 2b eventually being serviced by L1 cache agent 412.

In response to receiving Read request 442, a copy of modified cache line 426 will be forwarded from L1 data cache 116$_{1D}$ to L1 data cache 116$_{2D}$ via interconnect 112 and written to a slot 444, as depicted by an operation 3. In addition, each copy of cache line 426 in L1 data cache 116$_{1D}$ and L1 data cache 116$_{2D}$ will be marked as (S)hared, as depicted by cache line states 426$_{S2}$. For simplicity, existing cache lines in one or more of L1 data cache 116$_{2D}$ and L2 cache 118$_2$ that might be evicted as a result of copying cache line 426 are not shown, but similar results to those illustrated in FIG. 4a and discussed above may be expected if L1 data cache 116$_{2D}$ and L2 cache 118$_2$ are full.

In connection with operation 3, the copy of cache line 426 in L3 cache 108 is also updated to reflect the modified data in cache line 426. Additionally, the cache line 426 status data is updated to reflect that cache line 426 is now shared by both Core 1 and Core 2, as depicted by cache line status data 440$_{S2}$.

Each snoop has an associated cycle cost accruing latency, and consumes bandwidth on the processor's interconnects. Moreover, while a processor core is waiting for access to its requested data, processing of the thread requesting the access is stalled.

Figure 6:
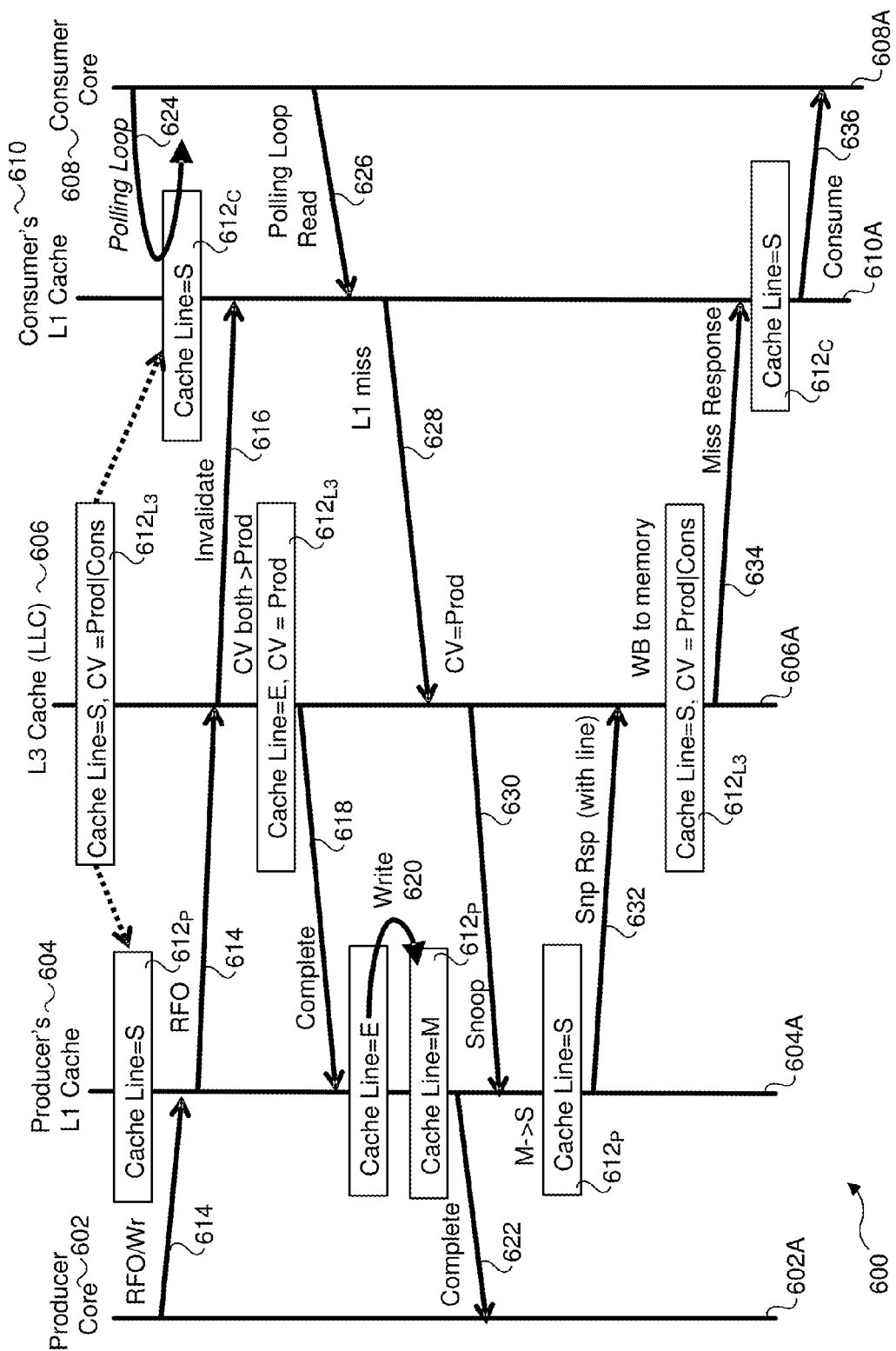
FIG. 6 is a message flow diagram illustrating a producer core accessing a cache line held in an L3 cache and modifying it, and a consumer core accessing the same cache line after the cache line has been modified, under a conventional approach.

A more complex memory access sequence is illustrated in FIG. 6, which shows a message flow diagram 600 implemented on a computer platform comprising a producer core 602 including a producer's L1 cache 604, an L3 cache (e.g., LLC) 606, and a consumer core 608 having a consumer's L1 cache 610. Each of these components has a respective agent, as depicted by agents 602A, 604A, 606A, 608A, and 610A. In FIG. 6, L2 caches are not shown since in this example the copies of the cache line are in the L1 caches.

At an initial state, there are three copies of a cache line 612 that are currently cached in producer's L1 cache 604, L3 cache 606, and consumer's L1 cache 610, respectively depicted as cache lines $612_P$, $612_{L3}$, and $612_C$. Each of cache lines $612_P$ and $612_C$ are marked as (S)hared, while cache line $612_{L3}$ includes cache line status data identifying cache line 612 is shared and each of the producer core and the consumer core hold a valid copy of the cache line.

As shown, producer core 602 desires to gain ownership of a shared cache line 602 so it can modify it. For example, if producer core 602 desires to modify its copy (cache line $612_P$) of cache line 612 by writing to it, it must first obtain ownership of the cache line. To obtain ownership of cache line 612, the producer core's agent 602A sends a Read For Ownership (RFO) (Wr)ite request 614 to agent 604A for producer's L1 cache 604. RFO 614 is forwarded by agent 604A to agent 606A for L3 cache 606. In response to receiving RFO 614, agent 606A sends an invalidate message 616 to the consumer's L1 cache agent 610A, and updates its cache line $612_{L3}$ status data to indicate the cache line is now in the (E)xclusive state, identifying the producer core 602 as the exclusive owner of cache line 612. Upon receipt of invalidate message 616, agent 610A will mark cache line $612_C$ as (I)nvalid (not shown).

Agent 606A for L3 cache 606 returns a complete message 618 to agent 604A for producer's L1 cache 604. Upon receipt, cache line $612_P$ is marked as (E)xclusive. Data is then written to cache line $612_P$ (as depicted by a Write 620), and cache line $612_P$ is marked as (M)odified. Agent 604A then returns a complete message 622 to producer core 602's agent 602A, completing the Write transaction.

Asynchronously, agent 608A for consumer core 608 periodically polls the status of cache lines in consumer's L1 cache 610, as depicted by a polling loop 624. Subsequently, agent 608A attempts to read its copy of cache line 612 (cache line $612_C$) using a polling loop read 626. Since at this point cache line $612_C$ is marked (I)nvalid, this results in an L1 cache miss, and agent 610A for consumer's L1 cache 610 sends a message 628 to agent 606A identifying producer core 602 as holding the valid cache line, as identified by a corresponding CV bit. Agent 606A then sends a snoop 630 with the read request to agent 604A. In response, the state of cache line $612_P$ is changed from (M)odified to (Shared), and a snoop response 632 including a copy of cache line $612_P$ is returned to agent 606A.

Upon receiving snoop response 632, agent 606A performs a memory write-back (WB) of the cache line, and returns the status of its copy ($612_{L3}$) to (S)hared, and appropriate CV bits are set to once again identify that producer core 602 and consumer core 608 hold valid copies of the cache line. Subsequently, a cache line miss response 634 including the modified copy of cache line 612 is received by agent 610A, which is used to overwrite the data in cache line $612_C$, and mark cache line $612_C$ as (S)hared. Once in the consumer's L1 cache, the consumer core 608 consumes the cache line, as depicted by a consume operation 636.

When the foregoing cache line access sequence was tested as a producer/consumer baseline transaction on one class of processor, it took 112 processor cycles just to complete the read request. That is a significant amount of overhead, with a large amount of traffic being sent between the various agents to facilitate the transaction while maintaining cache coherency. These operations cause longer latency for each memory access of producer-consumer workload, as in inter-VM communication. As a result, testing has shown the processor is stalled for more than 50% of its cycles (i.e., >50% of CPU cycles are spent without retiring instructions).

Ideally the producer could use a pushing-store instruction to push the data into consumer's mid-level cache (MLC) to save latency. However this approach requires the software to always know the target MLC, which can potentially be impractical, especially with frequent VM migration. Also the pushing operation may evict useful data in the consumer MLC due to the MLC's limited capacity.

To achieve good performance gain without having to foot the complexity, a new memory instruction, called Cache line LLC Allocation (CLLA), is envisioned. The CLLA instruction immediately allocates the cache line into the LLC from the producer's MLC, so that the consumer can access the data directly from the LLC to reduce the memory reference latency. Note that a CLLA instruction is generically a cache line demotion instruction which causes a cache line of a lower level cache to be moved into a higher level cache. Discussion with respect to movement from L1 to LLC is applicable to other movement such as L1 to L2, L2 to L3, MLC to LLC, etc. The CLLA instruction allows the software to provide application level knowledge to hardware for optimizations. By proactively pushing data to the LLC that is closer to the consumer, the communication latency is reduced by more than 2x, thus improving performance, as well as reducing the number of coherence messages (avoiding consulting snoop filter (SF)) to save energy.

Figure 7:
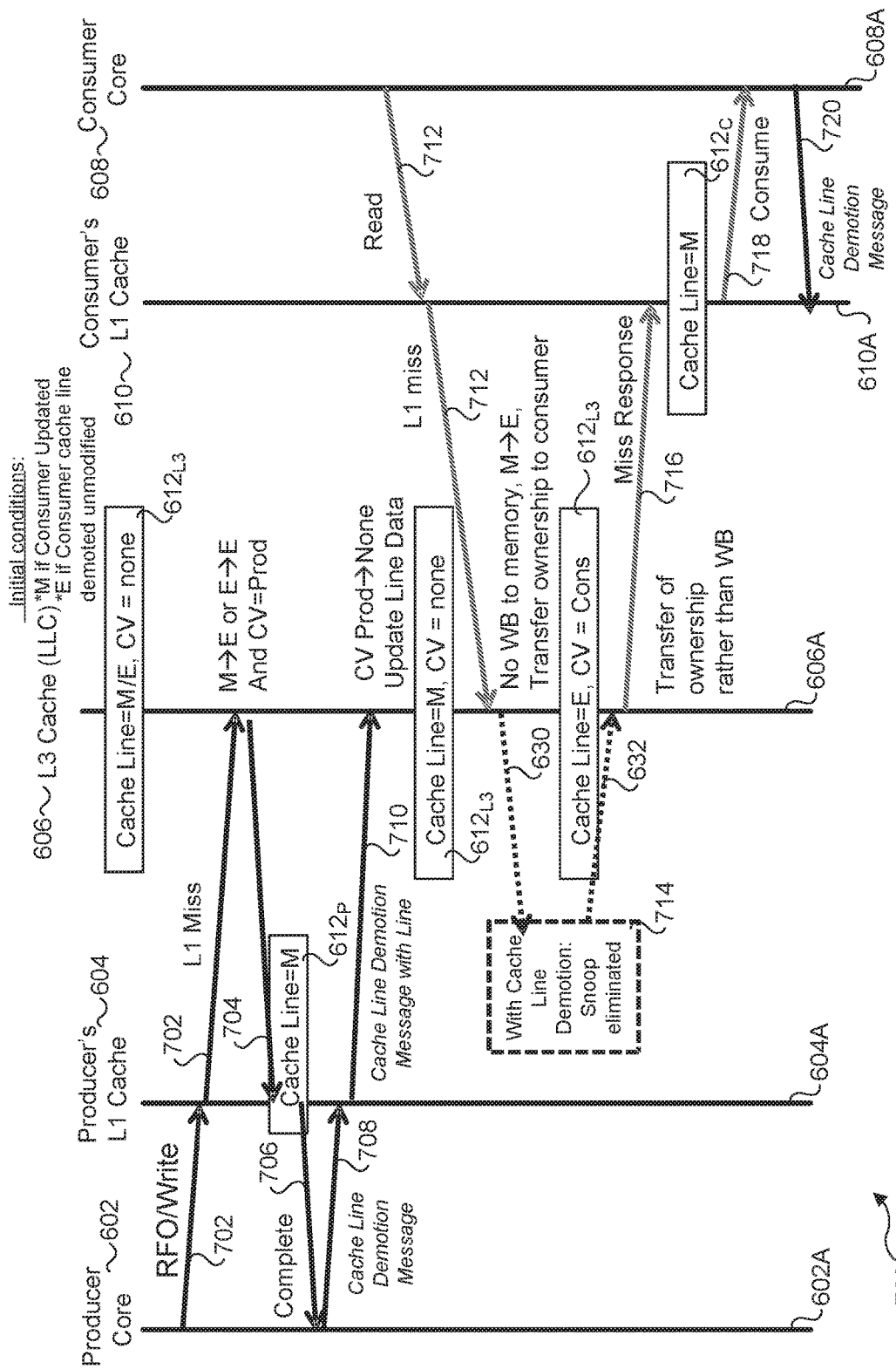
FIG. 7 is a message flow diagram illustrating a similar cache line access by the producer core and consumer core under which cache line demotion is used, according to one embodiment.

FIG. 7 shows a message flow diagram 700 corresponding to a similar pair of Write and Read transactions originating from producer core 602, and consumer core 608, respectively, that were performed in message flow diagram 600 of FIG. 6. Messages are passed between the same agents in both message flow diagrams. As a starting condition, there is a copy of cache line 612 in L3 cache 606, as depicted by cache line $612_{L3}$. The initial state of cache line $612_{L3}$ is either (M)odified, if the consumer's copy of cache line 612 has been updated, or (E)xclusive if the consumer's copy had been cache line demoted unmodified. The CV is none, indicating there is no copy of cache line present in either producer's L1 (or L2) cache 604 or consumer's L1 (or L2) cache 610.

As before, agent 602A for producer core 602 sends a RFO/Write message 702 to agent 604A, which results in an L1 miss. In response, agent 604A forwards RFO/Write message 702 to agent 606A for L3 cache 606, which has a copy of the requested cache line (cache line $612_{L3}$). Depending on the initial state, the state for cache line $612_{L3}$ is either transitioned from (M)odified to (E)xclusive, or remains (E)xclusive. The CV bits are updated to identify producer core 602 has the only valid copy of the cache line. A copy of cache line $612_{L3}$ is returned by agent 606A to agent 604A via a message 704, as depicted by cache line $612_P$. This copy is then updated by the producer's Write, and marked as (M)odified, followed by a complete message 706 returned to agent 602A.

Under the conventional approach, cache line $612_P$ would remain in producer's L1 cache 604 until it was evicted. However, under this new approach, the application that has modified the cache line includes a CLLA instruction to demote cache line $612_P$. Accordingly, in conjunction with execution of the CLLA instruction, a cache line demotion message 708 is sent by agent 602A to agent 604A to demote cache line $612_P$ to L3 cache 606. In response to receiving the cache line demotion message 708, agent 604A evicts cache line 612p and forwards the cache line to agent 606A, which overwrites (updates) the existing data in cache line $612_{L3}$, and marks the cache line as (M)odified. The CV bit for the producer core is reset to reflect there are no cores holding a valid copy of the cache line.

In a similar manner to above, agent 608A of consumer core 608 sends a Read request 712 to agent 610A identifying cache line 612. The lookup of cache line 612 results in a miss (for both of the consumers L1 and L2 caches), and agent 610A forwards Read request 712 to agent 606A. Since the modified version of cache line $612_P$ was demoted using the CLLA instruction, the modified copy of the requested cache line 612 is already in cache line $612_{L3}$. As a result, snoop message 630 and snoop response 632 are eliminated, as depicted by block 714.

In response to Read request 712, agent 606A returns a copy of the modified cache line $612_{L3}$ in a miss response message 716 to agent 610A. This copy of the modified cache line is then written to a cache line slot in consumer's L1 cache 610, as depicted by a cache line $612_C$ with a status marked as (M)odified. Cache line $612_C$ is then retrieved from consumer's L1 cache 610 to be consumed by consumer core 608, as depicted by a consume operation 718. If the application running on consumer core 608 knows it will only be reading a cache line, it can proactively demote it with the CLLA instruction, as depicted by a cache line demotion message 720.

Returning to cache line $612_{L3}$, in the embodiment illustrated in FIG. 7, there is no write-back to memory, even though the data in cache line $612_{L3}$ has been modified. The state of cache line $612_{L3}$ is marked as (E)xclusive, with CV set to the consumer, transferring ownership of the cache line to consumer's L1 cache 610 rather than performing a write-back to memory.

Using proactive cache line demotion with the CLLA instruction, latencies associated with memory transactions can be significantly reduced. For example, under message flow diagram 700, the number of processor cycles for the consumer Read memory access is reduced to 48 cycles. However, while proactive cache line demotion with a CLLA instruction provides benefits in most situations, performance inversion may occur in cases where both the producer and consumer threads that are sharing data reside on the same physical core, e.g., two simultaneous multi-threading (SMT) threads on one core. In these cases, instead of fetching the shared data directly from L1 or L2 cache (MLC), the core most likely has to go to L3 cache (LLC) to fetch the data that was demoted by the CLLA instruction. Note that demotion can occur from any level of cache. For example, from L1 to L2, or L1 to L3, or L2 to L4, L1 to L4, etc. As such, the performance suffers because accesses to LLC (~44 cycles) have higher latency than accesses to MLC (~14 cycles).

This performance inversion can be minimized by a hardware predictor that monitors the access pattern to a set of sample cache lines and adaptively determines whether or not to enable the CLLA instruction based on real-time behavior. The predictor first selects N random sample cache lines from the candidates for cache line demotion and continuously monitors them. For behavior tracking purpose, the selected sample cache lines are never demoted to LLC. A counter is maintained to track the number of accesses to the sample cache lines by local core requests versus those by remote snoops. For example, if a cache line access is through remote snoop, the hardware predictor decrements the counter by 1. If the cache line access is by local core request, the counter is incremented by 1. Over time, the counter gives an indication of whether the remote cores or local threads are more likely to access the sample cache lines. This, in turn, provides a good prediction of whether the CLLA instruction should be enabled or disabled.

When the counter value exceeds a selected threshold, indicating that most cache line accesses are from the local core, the producer and consumer threads are on the same physical core. To minimize the performance inversion caused by the core having to fetch data from the LLC instead of MLC, the CLLA instruction should be disabled for all cache line demotion candidates for that core. However, if the counter is below the selected threshold, indicating that most accesses are from remote core(s), then the CLLA instruction should be enabled to cause all cache line demotion candidates, excluding the monitored ones, to be proactively demoted. To simplify the discussion in the following exemplary embodiments in which the producer and consumer thread reside in the same physical core, memory coherency protocols are omitted and L1/L2 cache is referred to collectively as L1 cache.

Figure 8:
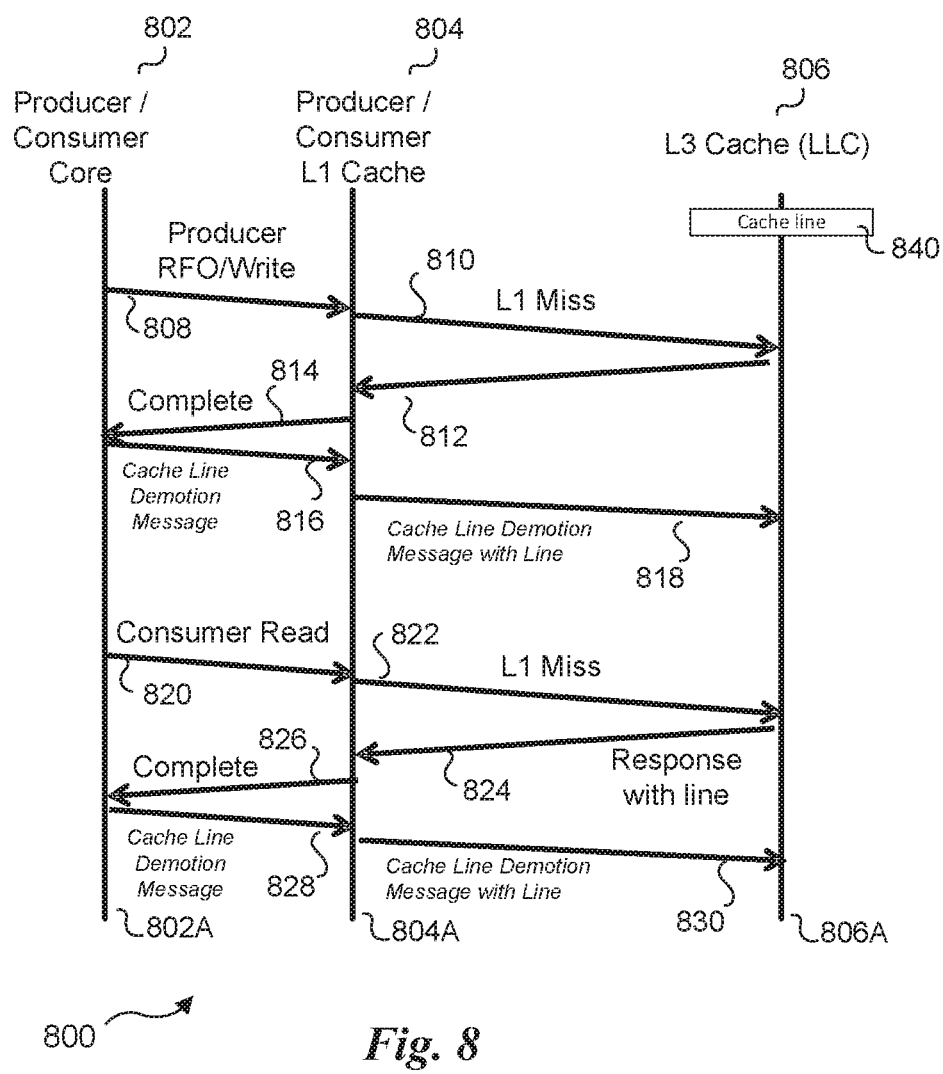
FIG. 8 is a message flow diagram illustrating a producer thread accessing and modifying a cache line held in an L3 cache, and a consumer thread that resides in the same physical core as the producer thread accessing the same cache line after the cache line has been modified, under which a cache line demotion instruction is enabled.

FIG. 8 shows an exemplary message flow diagram 800 corresponding to a pair of Write and Read transactions originating from a producer thread and a consumer thread that reside in the same physical core 802 with CLLA instruction enabled, according to an embodiment. FIG. 8 comprises a producer/consumer core 802 that includes a producer/consumer L1 cache 804, as well as an L3 cache (LLC) 806. Each of these components has a respective agent, as depicted by agents 802A, 804A, and 806A. Messages are passed between these agents in the message flow diagram. Note that different levels of cache could have been used, but that L1 and L3 are illustrated while L2 is explicitly omitted simply for illustrative purposes.

At an initial state, there is a copy of cache line 840 in the L3 cache. A producer thread in the producer/consumer core 802 desires to gain ownership of the cache line 840 so it can modify it. To obtain ownership, the producer/consumer core's agent 802A sends a RFO/Write request 808 to agent 804A of the producer/consumer L1 cache. The request results in an L1 miss. In response, agent 804A forwards the RFO request to agent 806A of the L3 cache 806 in message 810.

In response to receiving RFO message 810, agent 806A returns a copy of cache line 840 to agent 804A via message 812. Agent 804A then updates this copy of cache line 840 according to the producer thread's Write request and sends a complete message 814 to agent 802A. Next, because the CLLA instruction is enabled, upon its execution, a cache line demotion message 816 is sent by agent 802A to agent 804A to demote cache line 840 to L3 cache 806. In response to receiving the cache line demotion message 816, agent 804A evicts cache line 840 and forwards it to agent 806A via message 818. Agent 806A then overwrites the existing data in its copy of cache line 840 with the updated version.

Next, a consumer thread residing in the same core as the producer thread desires to access cache line 840. Accordingly, agent 802A sends a read request 820 to agent 804A identifying cache line 840. The lookup of cache line 840 results in a miss in the L1 cache because cache line 840 has already been demoted to the L3 cache. As a result of the miss, agent 804A forwards the read request to agent 806A in message 822. Upon receiving message 822, agent 806A responds with its copy of cache line 840 in message 824 back to agent 804A. Agent 804A then updates the received cache line 840 according to consumer thread's instructions. A complete message 826 is sent by agent 804A to agent 802A to confirm execution of the read message by the consumer thread. Again, since the CLLA instruction is enabled, upon its execution, a message 828 is sent by agent 802A to agent 804A to demote cache line 840 to the L3 cache. Accordingly, agent 804A evicts cache line 840 and forwards it to agent 806A via message 830. Agent 806A then overwrites the existing data in its copy of cache line 840 with the updated version.

Figure 9:
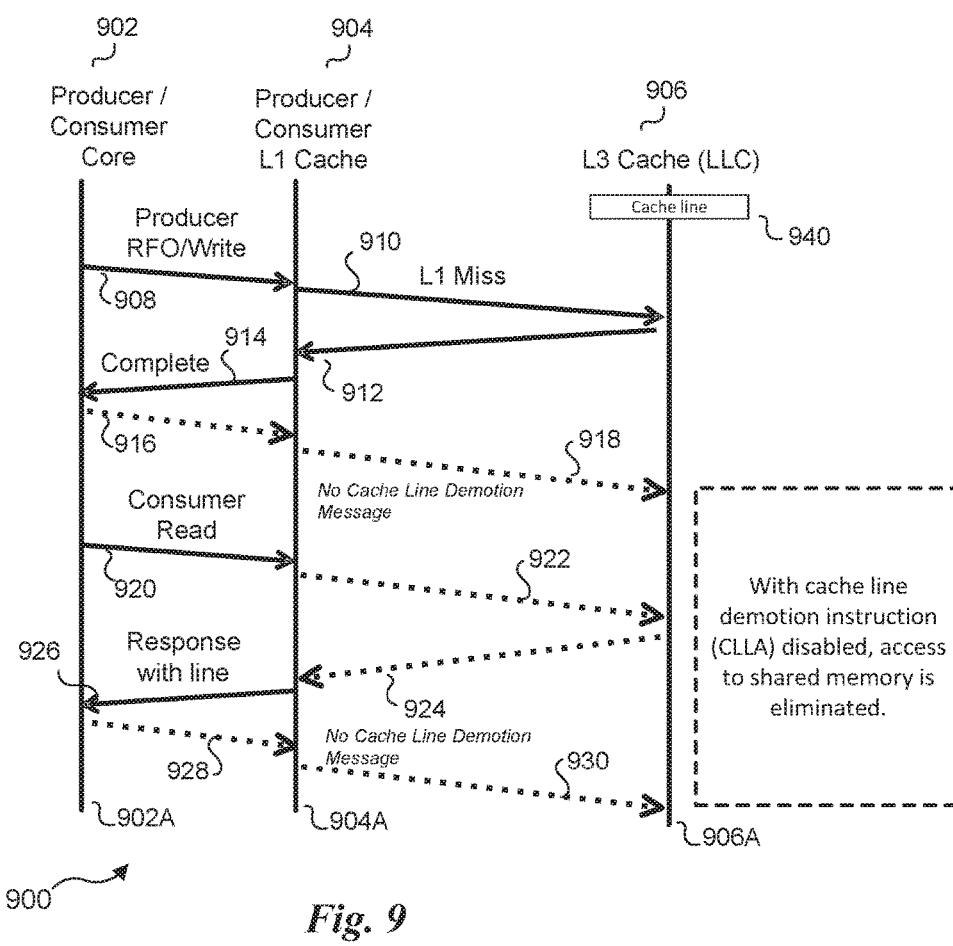
FIG. 9 is a message flow diagram illustrating a similar cache line access by producer and consumer threads residing in the same physical core but with cache line demotion instruction disabled.

FIG. 9 shows an exemplary message flow diagram 900 corresponding to a similar pair of Write and Read transactions that were performed in message flow diagram 800 of FIG. 8 where both the producer thread and consumer thread reside in the same physical core according to an embodiment. However, in contrast with FIG. 8, the CLLA instruction is disabled in FIG. 9. Note again that different levels of cache could have been used, but that L1 and L3 are illustrated simply for illustrative purposes.

As before, agent 902A for the producer/consumer core 902 sends a RFO/Write message 908 to agent 904A which results in an L1 miss. In response, agent 904A forwards the RFO/Write request in message 910 to agent 906A for the L3 cache 906. A copy of cache line 940 is returned by agent 906A to agent 904A via message 912. Upon receipt of a copy of cache line 940, agent 904A updates it according to the producer thread's Write request followed by returning a complete message 914 to agent 902A indicating task executed. This time, since the CLLA instruction is disabled, cache line 940 is not demoted from L1 cache to L3 cache. Cache line demotion messages 916 and 918 are thus eliminated, as depicted by corresponding dotted lines.

Next, similar to the message flow diagram of FIG. 8, a consumer thread residing in the same core as the producer thread desires to access cache line 940. Accordingly, agent 902A sends a consumer read request 920 to agent 904A. Since cache line 940 was not demoted from L1 to L3 cache by the CLLA instruction, producer/consumer L1 cache 904 has a valid copy of cache line 940. Agent 904A does not have to fetch cache line 940 from L3 cache 906, thus eliminating memory access messages 922 and 924. Instead, agent 904A responds directly to agent 902A's read request with its copy of cache line 940 in message 926. Again, because the CLLA instruction is disabled, cache line demotion messages 928 and 930 are also eliminated.

Figure 10:
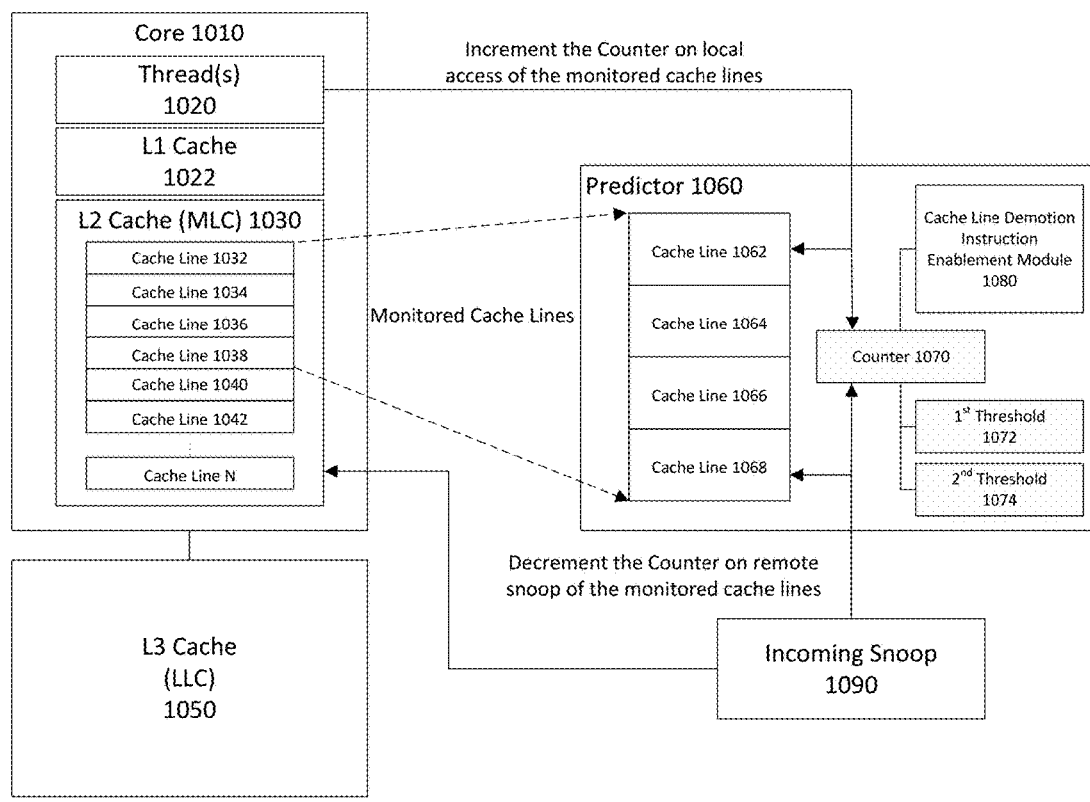
FIG. 10 is a schematic diagram illustrating an exemplary hardware predictor including various hardware components.

FIG. 10 shows an exemplary hardware configuration of a predictor that includes a CPU core 1010, an L3 cache (LLC) 1050, and a predictor 1060. The CPU core 1010 further includes processing thread(s) 1020, an L1 cache 1022, and an L2 cache (MLC) 1030. Cache lines 1032-N are shown as individual blocks inside the L2 cache (MLC). The predictor 1060 includes a counter 1070, a first threshold 1072, a second threshold 1074, and a cache line demotion instruction enablement module 1080. The predictor monitors a number of randomly selected sample cache lines in the L2 Cache (MLC) and tracks their accesses by, for example, an incoming snoop 1090. These monitored cache lines are depicted as cache lines 1062-1068 inside the predictor 1060 in FIG. 10.

Figure 11:
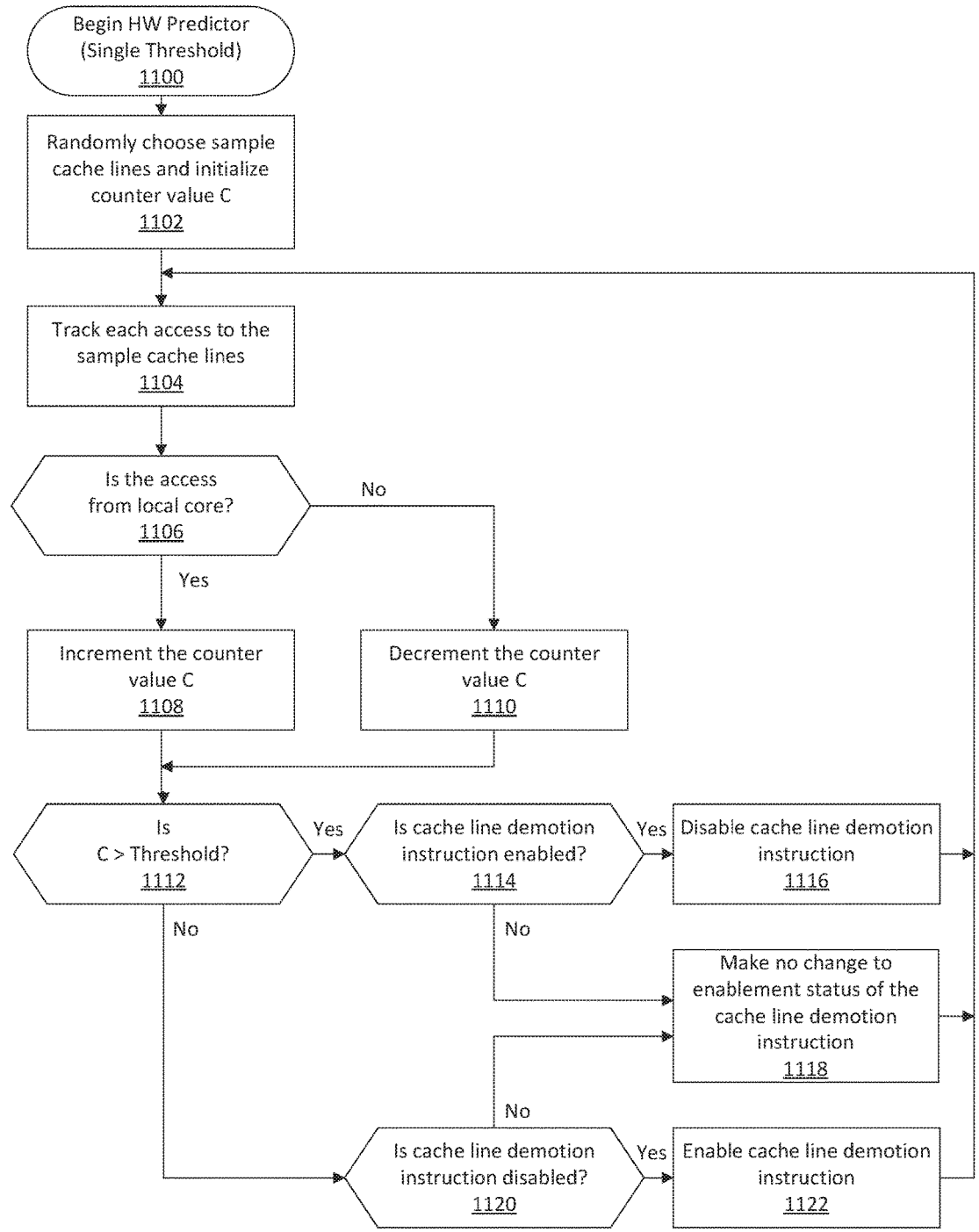
FIG. 11 is a flow chart illustrating operations and logic for implementing a hardware predictor with a single threshold according to one embodiment.

FIG. 11 is a flow chart illustrating operations and logic for implementing the hardware predictor with a single threshold according to one embodiment. The flow chart begins at block 1100. In block 1102 the predictor selects one or more random sample cache lines from a group of cache line demotion candidates in the first cache. The selected sample cache lines are continuously monitored by the predictor and are excluded from demotion by the cache line demotion instruction. The number of sample cache lines selected may depend on factors such as the size of the different caches, e.g. MLC and LLC. The selected sample cache lines may be replaced periodically with new sample cache lines. The predictor also initializes a counter, in block 1102, for tracking the number of local core requests versus the number of remote snoops that are accessing the sample cache lines. The initial value of the counter may depend on factors such as the threshold selected and the size of the caches. The counter should be reset whenever the selected sample cache lines are replaced with new cache lines.

In block 1104 the predictor tracks each access to the sample cache lines. In block 1106, the predictor determines, for each access, whether it is from a local core or a remote core. This determination can be made by looking at whether or not the access is a remote snoop. If the access to a sample cache line is a remote snoop, indicating access from a remote core, the counter is decremented by 1 as illustrated in block 1110. Conversely, if the access is not a remote snoop, signifying a local access, the counter is incremented by 1 as depicted by block 1108.

In block 1112, the predictor checks to see if the counter is greater than a selected threshold. If the counter is greater than the threshold, then there are more local accesses to the sample cache lines than remote accesses. The predictor next checks for the enablement status of the cache line demotion instruction, or cache line LLC allocation (CLLA) instruction, in block 1114. If the CLLA instruction is enabled (Yes, at block 1114), the predictor disables it in block 1116. If the CLLA instruction is already disabled (No, at block 1114), the predictor makes no change to the enablement status of the CLLA instruction in block 1118 and returns to the monitoring of accesses to the sample cache lines at block 1104.

On the other hand, if in block 1112 the predictor determines that the counter is not greater than the selected threshold, indicating more remote accesses to the sample cache lines than local accesses, the predictor enables the CLLA instruction. In block 1120, the predictor checks for the enablement of the CLLA instruction. If the CLLA instruction is disabled (Yes, at block 1120), the predictor enables it in block 1122. If the CLLA instruction is already enabled (No, at block 1120), the predictor makes no change to the enablement status of the cache line demotion instruction in block 1118 and returns to the monitoring of accesses to the sample cache lines at block 1104.

Figure 12:
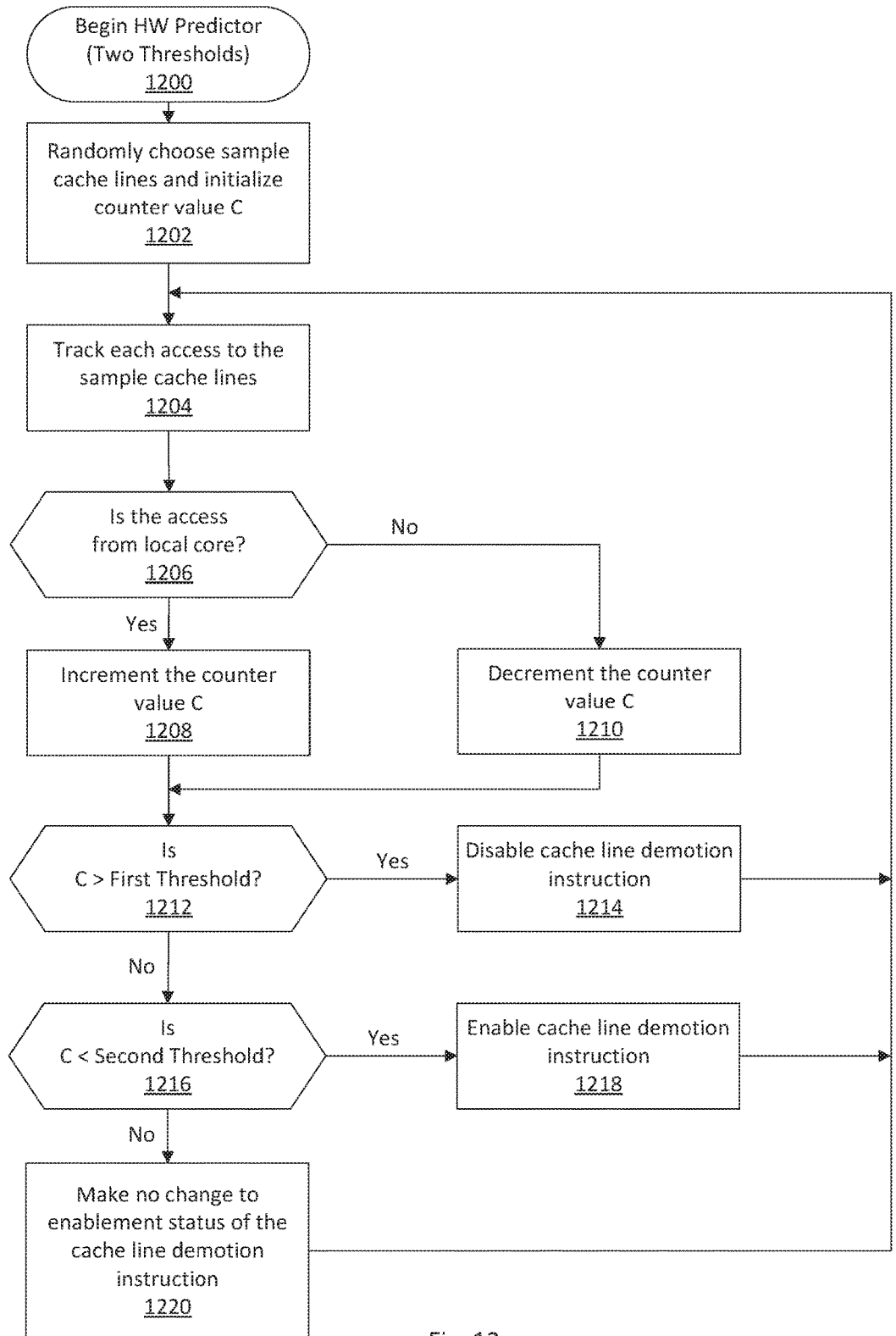
FIG. 12 is a flow chart illustrating operations and logic for implementing a hardware predictor with two thresholds according to one embodiment.

FIG. 12 shows a flow chart illustrating operations and logic for implementing the hardware predictor with two thresholds according to another embodiment. The flow chart begins at block 1200. In block 1202 the predictor selects one or more random sample cache lines from a group of cache line demotion candidates in the first cache. The selected sample cache lines are continuously monitored by the predictor and, for behavior tracking purposes, excluded from demotion by the cache line demotion instruction. The number of sample cache lines selected may depend on the size of the caches. Also in block 1202, the predictor initializes a counter for comparing the number of local core requests versus the number of remote snoops that are accessing the sample cache lines. The initial value of the counter may depend on the threshold selected and/or the size of the caches.

In block 1204 the predictor tracks each access to the sample cache lines. In block 1206, the predictor determines, for each access, whether it is from a local core or a remote core. This determination is made by looking at whether the access is a remote snoop or not. A remote snoop signifies access by a remote core and the counter is decremented by 1 as illustrated in block 1210. On the other hand, if the access is not a remote snoop, indicating access within the local core, the counter is incremented by 1 as shown in block 1208.

In block 1212, the predictor checks to see if the counter is greater than a first selected threshold. If the counter is greater than the first threshold then there are more local accesses to the sample cache lines than remote accesses. Thus the predictor disables the CLLA instruction in block 1214 and returns to monitoring accesses to the sample cache lines at block 1204.

If in block 1212 the counter is not greater than the first selected threshold, the predictor next checks to see if the counter is lower than a second selected threshold in block 1216. If the counter is lower than the second threshold, the predictor enables the cache line demotion instruction, or cache line LLC allocation (CLLA) instruction, in block 1218 because there are more remote accesses to the sample cache lines than local accesses. The predictor then returns to monitoring accesses to the sample cache lines at block 1204. In the event that the counter is neither higher than the first threshold nor lower than the second, the predictor makes no change to the enablement status of the CLLA instruction at block 1120 and returns to monitoring accesses to the sample cache lines at block 1204.

Detailed below are embodiments of processing systems that may utilize the above embodiments.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 13A is a block diagram illustrating both an exemplary in-order pipeline and an exemplary register renaming, out-of-order issue/execution pipeline according to embodiments of the invention. FIG. 13B is a block diagram illustrating both an exemplary embodiment of an in-order architecture core and an exemplary register renaming, out-of-order issue/execution architecture core to be included in a processor according to embodiments of the invention. The solid lined boxes in FIGS. 13A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 13A, a processor pipeline 1300 includes a fetch stage 1302, a length decode stage 1304, a decoding stage 1306, an allocation stage 1308, a renaming stage 1310, a schedule (also known as a dispatch or issue) stage 1312, a register read/memory read stage 1314, an execute stage 1316, a write back/memory write stage 1318, an exception handling stage 1322, and a commit stage 1324.

FIG. 13B shows processor core 1390 including a front end unit 1330 coupled to an execution engine unit 1350, and both are coupled to a memory unit 1370. The core 1390 may be a reduced instruction set computing (RISC) core, a complex instruction set computing (CISC) core, a very long instruction word (VLIW) core, or a hybrid or alternative core type. As yet another option, the core 1390 may be a special-purpose core, such as, for example, a network or communication core, compression engine, coprocessor core, general purpose computing graphics processing unit (GPGPU) core, graphics core, or the like.

The front end unit 1330 includes a branch prediction unit 1332 coupled to an instruction cache unit 1334, which is coupled to an instruction translation lookaside buffer (TLB) unit 1336, which is coupled to an instruction fetch unit 1338, which is coupled to a decode unit 1340. The decode unit 1340 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1390 includes a microcode ROM or other medium that stores microcode for certain macroinstructions (e.g., in decode unit 1340 or otherwise within the front end unit 1330). The decode unit 1340 is coupled to a rename/allocator unit 1352 in the execution engine unit 1350.

The execution engine unit 1350 includes the rename/allocator unit 1352 coupled to a retirement unit 1354 and a set of one or more scheduler unit(s) 1356. The scheduler unit(s) 1356 represents any number of different schedulers, including reservation stations, central instruction window, etc. The scheduler unit(s) 1356 is coupled to the physical register file(s) unit(s) 1358. Each of the physical register file(s) units 1358 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1358 comprises a vector registers unit, a write mask registers unit, and a scalar registers unit. These register units may provide architectural vector registers, vector mask registers, and general purpose registers. The physical register file(s) unit(s) 1358 is overlapped by the retirement unit 1354 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 1354 and the physical register file(s) unit(s) 1358 are coupled to the execution cluster(s) 1360. The execution cluster(s) 1360 includes a set of one or more execution units 1362 and a set of one or more memory access units 1364. The execution units 1362 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1356, physical register file(s) unit(s) 1358, and execution cluster(s) 1360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster. In the case of a separate memory access pipeline, certain embodiments are implemented in which only the execution cluster of this pipeline has the memory access unit(s) 1364. It should also be understood that where separate pipelines are used, one or more of these pipelines may be out-of-order issue/execution and the rest in-order.

The set of memory access units 1364 is coupled to the memory unit 1370, which includes a data TLB unit 1372 coupled to a data cache unit 1374 coupled to a level 2 (L2) cache unit 1376. In one exemplary embodiment, the memory access units 1364 may include a load unit, a store address unit, and a store data unit, each of which is coupled to the data TLB unit 1372 in the memory unit 1370. The instruction cache unit 1334 is further coupled to a level 2 (L2) cache unit 1376 in the memory unit 1370. The L2 cache unit 1376 is coupled to one or more other levels of cache and eventually to a main memory.

By way of example, the exemplary register renaming, out-of-order issue/execution core architecture may implement the pipeline 1300 as follows: 1) the instruction fetch 1338 performs the fetch and length decoding stages 1302 and 1304; 2) the decode unit 1340 performs the decode stage 1306; 3) the rename/allocator unit 1352 performs the allocation stage 1308 and renaming stage 1310; 4) the scheduler unit(s) 1356 performs the schedule stage 1312; 5) the physical register file(s) unit(s) 1358 and the memory unit 1370 performs the register read/memory read stage 1314; the execution cluster 1360 perform the execute stage 1316; 6) the memory unit 1370 and the physical register file(s) unit(s) 1358 perform the write back/memory write stage 1318; 7) various units may be involved in the exception handling stage 1322; and 8) the retirement unit 1354 and the physical register file(s) unit(s) 1358 perform the commit stage 1324.

The core 1390 may support one or more instructions sets (e.g., the x86 instruction set (with some extensions that have been added with newer versions)); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1334/1374 and a shared L2 cache unit 1376, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 14B:
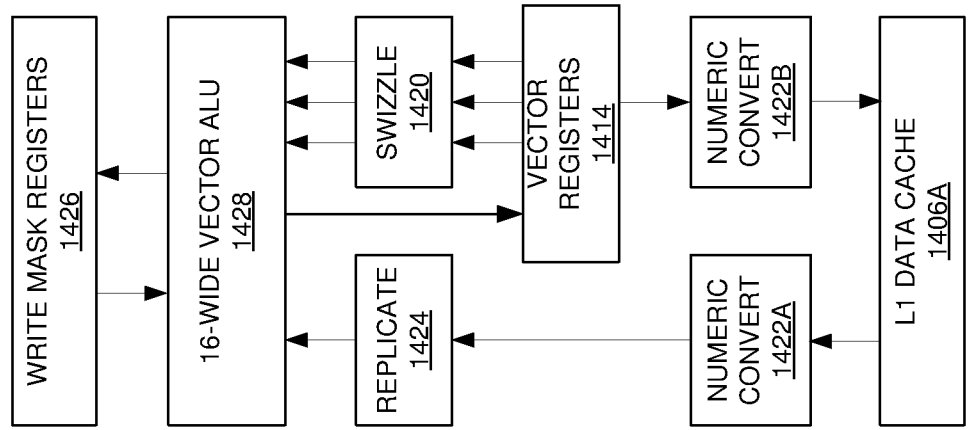
FIGS. 14A-B illustrate block diagrams of a more specific exemplary in-order core architecture, which core would be one of several logic blocks (including other cores of the same type and/or different types) in a chip.
Figure 14A:
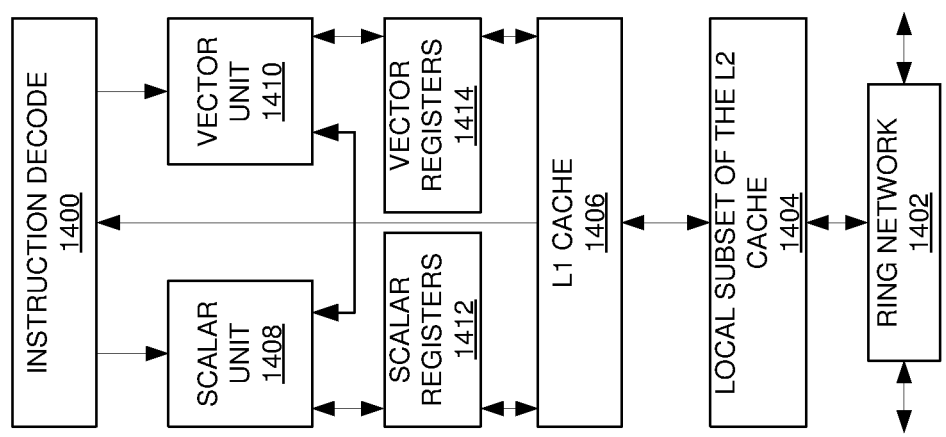

FIGS. 14A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 14A is a block diagram of a single processor core, along with its connection to the on-die interconnect network 1402 and with its local subset of the Level 2 (L2) cache 1404, according to embodiments of the invention. In one embodiment, an instruction decoder 1400 supports the x86 instruction set with a packed data instruction set extension. An L1 cache 1406 allows low-latency accesses to cache memory into the scalar and vector units. While in one embodiment (to simplify the design), a scalar unit 1408 and a vector unit 1410 use separate register sets (respectively, scalar registers 1412 and vector registers 1414) and data transferred between them is written to memory and then read back in from a level 1 (L1) cache 1406, alternative embodiments of the invention may use a different approach (e.g., use a single register set or include a communication path that allows data to be transferred between the two register files without being written and read back).

The local subset of the L2 cache 1404 is part of a global L2 cache that is divided into separate local subsets, one per processor core. Each processor core has a direct access path to its own local subset of the L2 cache 1404. Data read by a processor core is stored in its L2 cache subset 1404 and can be accessed quickly, in parallel with other processor cores accessing their own local L2 cache subsets. Data written by a processor core is stored in its own L2 cache subset 1404 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 14B is an expanded view of part of the processor core in FIG. 14A according to embodiments of the invention. FIG. 14B includes an L1 data cache 1406A which is part of the L1 cache 1404, as well as more detail regarding the vector unit 1410 and the vector registers 1414. Specifically, the vector unit 1410 is a 16-wide vector processing unit (VPU) (see the 16-wide vector ALU 1428), which executes one or more of integer, single-precision float, and double-precision float instructions. The VPU supports swizzling the register inputs with swizzle unit 1420, numeric conversion with numeric convert units 1422A-B, and replication with replicate unit 1424 on the memory input. Write mask registers 1426 allow predicating resulting vector writes.

Processor with Integrated Memory Controller and Graphics

Figure 15:
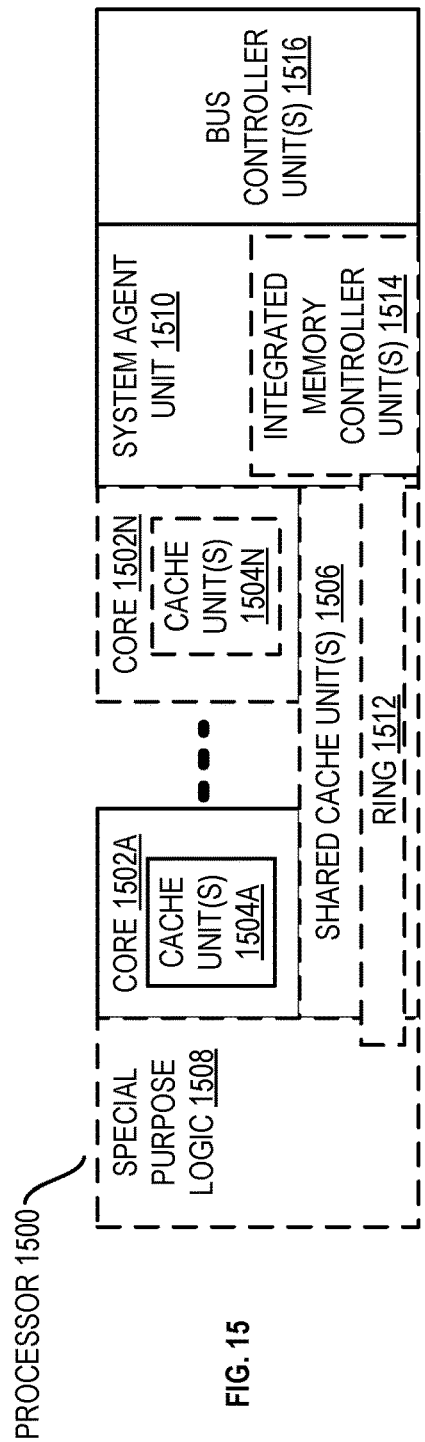
FIG. 15 is a block diagram of a processor 1500 that may have more than one core, may have an integrated memory controller, and may have integrated graphics according to embodiments of the invention.

FIG. 15 is a block diagram of a processor 1500 that may have more than one core, may have an integrated memory controller, and may have integrated graphics according to embodiments of the invention. The solid lined boxes in FIG. 15 illustrate a processor 1500 with a single core 1502A, a system agent 1510, a set of one or more bus controller units 1516, while the optional addition of the dashed lined boxes illustrates an alternative processor 1500 with multiple cores 1502A-N, a set of one or more integrated memory controller unit(s) 1514 in the system agent unit 1510, and special purpose logic 1508.

Thus, different implementations of the processor 1500 may include: 1) a CPU with the special purpose logic 1508 being integrated graphics and/or scientific (throughput) logic (which may include one or more cores), and the cores 1502A-N being one or more general purpose cores (e.g., general purpose in-order cores, general purpose out-of-order cores, a combination of the two); 2) a coprocessor with the cores 1502A-N being a large number of special purpose cores intended primarily for graphics and/or scientific (throughput); and 3) a coprocessor with the cores 1502A-N being a large number of general purpose in-order cores. Thus, the processor 1500 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1500 may be a part of and/or may be implemented on one or more substrates using any of a number of process technologies, such as, for example, bipolar-complementary metal-oxide semiconductor (BiCMOS), complementary metal-oxide semiconductor (CMOS), or n-channel metal-oxide-semiconductor (NMOS).

The memory hierarchy includes one or more levels of cache within the cores, a set of one or more shared cache units 1506, and external memory (not shown) coupled to the set of integrated memory controller units 1514. The set of one or more shared cache units 1506 may include one or more mid-level caches, such as level 2 (L2), level 3 (L3), level 4 (L4), or other levels of cache, a last level cache (LLC), and/or combinations thereof. While in one embodiment a ring based interconnect unit 1512 interconnects the special purpose logic 1508 (which may be integrated graphics logic), the set of shared cache units 1506, and the system agent unit 1510/integrated memory controller unit(s) 1514, alternative embodiments may use any number of well-known techniques for interconnecting such units. In one embodiment, coherency is maintained between one or more cache units 1506 and cores 1502A-N.

In some embodiments, one or more of the cores 1502A-N are capable of multi-threading. The system agent 1510 includes those components coordinating and operating cores 1502A-N. The system agent unit 1510 may include for example a power control unit (PCU) and a display unit. The PCU may be or include logic and components needed for regulating the power state of the cores 1502A-N and the integrated graphics or special purpose logic 1508. The display unit is for driving one or more externally connected displays.

The cores 1502A-N may be homogenous or heterogeneous in terms of architecture instruction set; that is, two or more of the cores 1502A-N may be capable of executing the same instruction set, while others may be capable of executing only a subset of that instruction set or a different instruction set.

Exemplary Computer Architectures

FIGS. 16-19 are block diagrams of exemplary computer architectures. Other system designs and configurations known in the arts for laptops, desktops, handheld personal computers (PCs), personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 16:
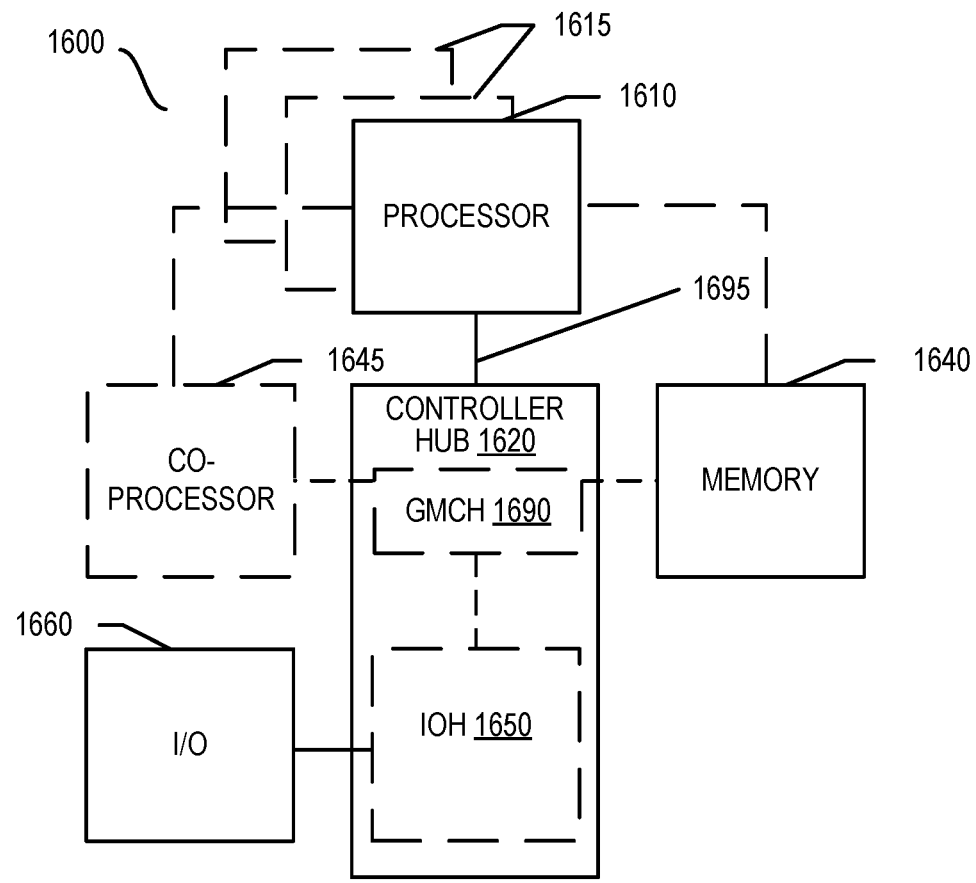
FIGS. 16-19 are block diagrams of exemplary computer architectures.

Referring now to FIG. 16, shown is a block diagram of a system 1600 in accordance with one embodiment of the present invention. The system 1600 may include one or more processors 1610, 1615, which are coupled to a controller hub 1620. In one embodiment the controller hub 1620 includes a graphics memory controller hub (GMCH) 1690 and an Input/Output Hub (IOH) 1650 (which may be on separate chips); the GMCH 1690 includes memory and graphics controllers to which are coupled memory 1640 and a coprocessor 1645; the IOH 1650 couples input/output (I/O) devices 1660 to the GMCH 1690. Alternatively, one or both of the memory and graphics controllers are integrated within the processor (as described herein), the memory 1640 and the coprocessor 1645 are coupled directly to the processor 1610, and the controller hub 1620 is in a single chip with the IOH 1650.

The optional nature of additional processors 1615 is denoted in FIG. 16 with broken lines. Each processor 1610, 1615 may include one or more of the processing cores described herein and may be some version of the processor 1500.

The memory 1640 may be, for example, dynamic random access memory (DRAM), phase change memory (PCM), or a combination of the two. For at least one embodiment, the controller hub 1620 communicates with the processor(s) 1610, 1615 via a multi-drop bus, such as a frontside bus (FSB), point-to-point interface such as QuickPath Interconnect (QPI), or similar connection 1695.

In one embodiment, the coprocessor 1645 is a special-purpose processor, such as, for example, a high-throughput MIC processor, a network or communication processor, compression engine, graphics processor, GPGPU, embedded processor, or the like. In one embodiment, controller hub 1620 may include an integrated graphics accelerator.

There can be a variety of differences between the processors 1610, 1615, in terms of a spectrum of metrics of merit including architectural, microarchitectural, thermal, power consumption characteristics, and the like.

In one embodiment, the processor 1610 executes instructions that control data processing operations of a general type. Embedded within the instructions may be coprocessor instructions. The processor 1610 recognizes these coprocessor instructions as being of a type that should be executed by the attached coprocessor 1645. Accordingly, the processor 1610 issues these coprocessor instructions (or control signals representing coprocessor instructions) on a coprocessor bus or other interconnect, to coprocessor 1645. Coprocessor(s) 1645 accept and execute the received coprocessor instructions.

Figure 17:
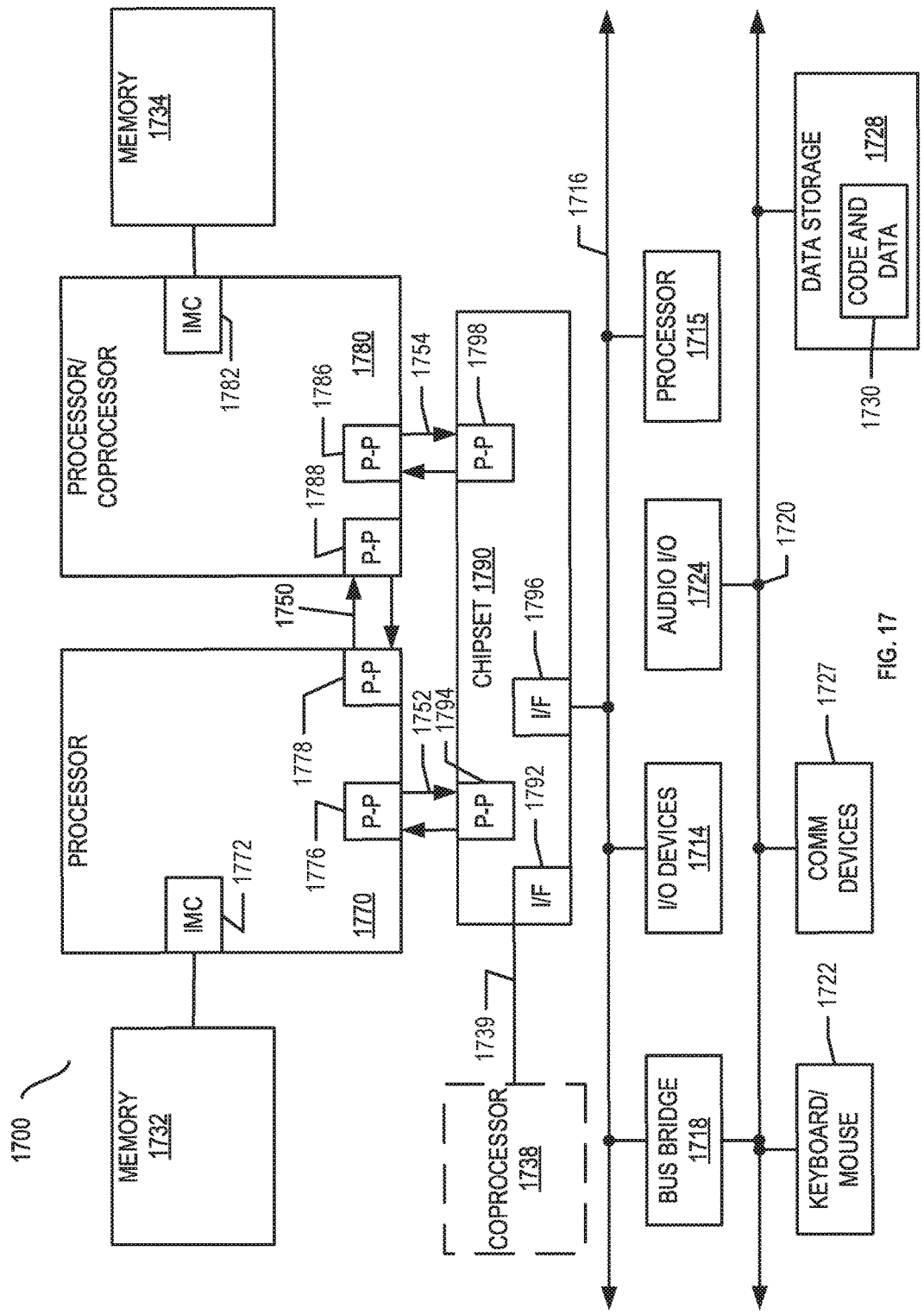

Referring now to FIG. 17, shown is a block diagram of a first more specific exemplary system 1700 in accordance with an embodiment of the present invention. As shown in FIG. 17, multiprocessor system 1700 is a point-to-point interconnect system, and includes a first processor 1770 and a second processor 1780 coupled via a point-to-point interconnect 1750. Each of processors 1770 and 1780 may be some version of the processor 1500. In one embodiment of the invention, processors 1770 and 1780 are respectively processors 1610 and 1615, while coprocessor 1738 is coprocessor 1645. In another embodiment, processors 1770 and 1780 are respectively processor 1610 coprocessor 1645.

Processors 1770 and 1780 are shown including integrated memory controller (IMC) units 1772 and 1782, respectively. Processor 1770 also includes as part of its bus controller units point-to-point (P-P) interfaces 1776 and 1778; similarly, second processor 1780 includes P-P interfaces 1786 and 1788. Processors 1770, 1780 may exchange information via a point-to-point (P-P) interface 1750 using P-P interface circuits 1778, 1788. As shown in FIG. 17, IMCs 1772 and 1782 couple the processors to respective memories, namely a memory 1732 and a memory 1734, which may be portions of main memory locally attached to the respective processors.

Processors 1770, 1780 may each exchange information with a chipset 1790 via individual P-P interfaces 1752, 1754 using point to point interface circuits 1776, 1794, 1786, 1798. Chipset 1790 may optionally exchange information with the coprocessor 1738 via a high-performance interface 1739. In one embodiment, the coprocessor 1738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1790 may be coupled to a first bus 1716 via an interface 1796. In one embodiment, first bus 1716 may be a Peripheral Component Interconnect (PCI) bus, or a bus such as a PCI Express bus or another third generation I/O interconnect bus, although the scope of the present invention is not so limited.

As shown in FIG. 17, various I/O devices 1714 may be coupled to first bus 1716, along with a bus bridge 1718 which couples first bus 1716 to a second bus 1720. In one embodiment, one or more additional processor(s) 1715, such as coprocessors, high-throughput MIC processors, GPGPU's, accelerators (such as, e.g., graphics accelerators or digital signal processing (DSP) units), field programmable gate arrays, or any other processor, are coupled to first bus 1716. In one embodiment, second bus 1720 may be a low pin count (LPC) bus. Various devices may be coupled to a second bus 1720 including, for example, a keyboard and/or mouse 1722, communication devices 1727 and data storage unit 1728 such as a disk drive or other mass data storage device which may include instructions/code and data 1730, in one embodiment. Further, an audio I/O 1724 may be coupled to the second bus 1720. Note that other architectures are possible. For example, instead of the point-to-point architecture of FIG. 17, a system may implement a multi-drop bus or other such architecture.

Figure 18:
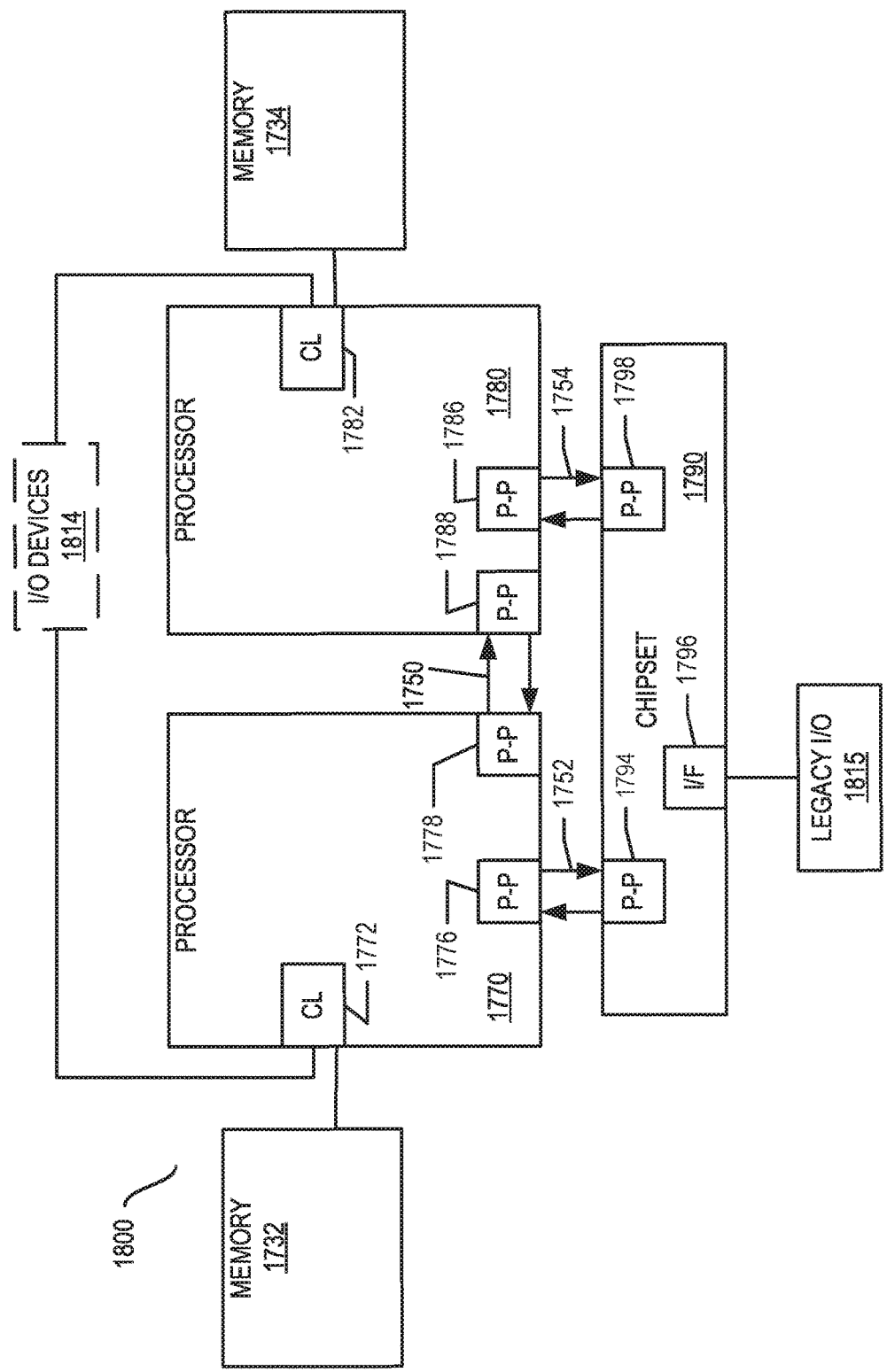

Referring now to FIG. 18, shown is a block diagram of a second more specific exemplary system 1800 in accordance with an embodiment of the present invention. Like elements in FIGS. 17 and 18 bear like reference numerals, and certain aspects of FIG. 17 have been omitted from FIG. 18 in order to avoid obscuring other aspects of FIG. 18.

FIG. 18 illustrates that the processors 1770, 1780 may include integrated memory and I/O control logic ("CL") 1772 and 1782, respectively. Thus, the CL 1772, 1782 include integrated memory controller units and include I/O control logic. FIG. 18 illustrates that not only are the memories 1732, 1734 coupled to the CL 1772, 1782, but also that I/O devices 1814 are also coupled to the control logic 1772, 1782. Legacy I/O devices 1815 are coupled to the chipset 1790.

Figure 19:
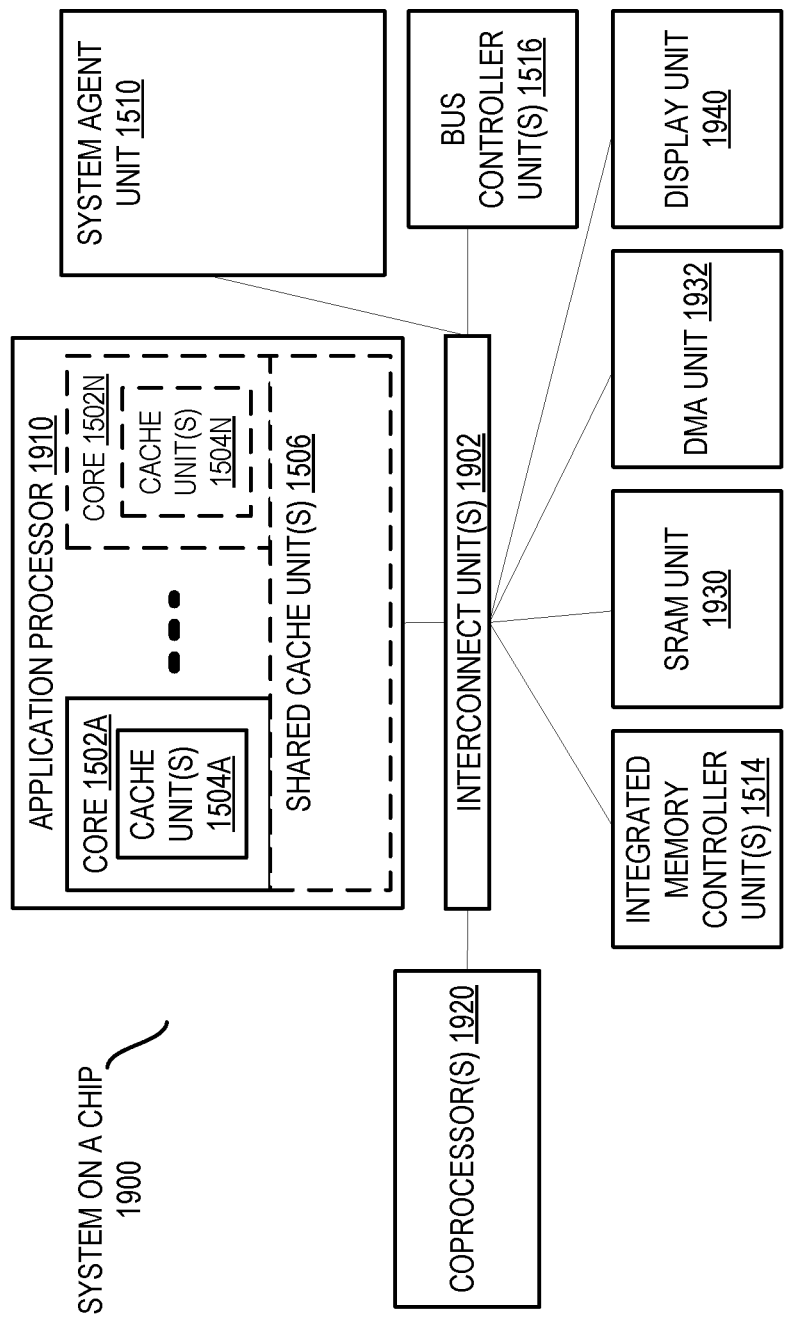

Referring now to FIG. 19, shown is a block diagram of a SoC 1900 in accordance with an embodiment of the present invention. Similar elements in FIG. 15 bear like reference numerals. Also, dashed lined boxes are optional features on more advanced SoCs. In FIG. 19, an interconnect unit(s) 1902 is coupled to: an application processor 1910 which includes a set of one or more cores 1502A-1502N having respective cache units 1504A-1504N, and shared cache unit(s) 1506; a system agent unit 1510; a bus controller unit(s) 1516; an integrated memory controller unit(s) 1514; a set of one or more coprocessors 1920 which may include integrated graphics logic, an image processor, an audio processor, and a video processor; a static random access memory (SRAM) unit 1930; a direct memory access (DMA) unit 1932; and a display unit 1940 for coupling to one or more external displays. In one embodiment, the coprocessor(s) 1920 include a special-purpose processor, such as, for example, a network or communication processor, compression engine, GPGPU, a high-throughput MIC processor, embedded processor, or the like.

Embodiments of the invention disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1730 illustrated in FIG. 17, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, embodiments of the invention described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 20 is a block diagram contrasting the use of a software instruction converter to convert binary instructions in a source instruction set to binary instructions in a target instruction set according to embodiments of the invention. FIG. 20 shows that a program in a high level language 2002 may be compiled using an x86 compiler 2004 to generate x86 binary code 2006 that may be natively executed by a processor with at least one x86 instruction set core 2016. FIG. 20 also shows that the program in the high level language 2002 may be compiled using an alternative instruction set compiler 2008 to generate alternative instruction set binary code 2010 that may be natively executed by a processor without at least one x86 instruction set core 2014. The instruction converter 2012 is used to convert the x86 binary code 2006 into code that may be natively executed by the processor without an x86 instruction set core 2014.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention[[s]]. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. An apparatus comprising:
a plurality of hardware processor cores, wherein each of the hardware processor cores includes a first cache;
a second cache, communicatively coupled to and shared by the plurality of hardware processor cores; and
a predictor circuit for tracking accesses to a plurality of monitored cache lines in the first cache and controlling enablement of a cache line demotion instruction based upon the tracked accesses, wherein the predictor circuit is operable to:
store addresses of a plurality of cache lines in the first cache;
maintain a counter for tracking a number of intra-core accesses compared to a number of inter-core accesses;
increment the counter upon an intra-core access to an address of one of the plurality of monitored cache lines in the first cache;
decrement the counter upon an inter-core access to an address of one of the plurality of monitored cache lines in the first cache;
disable the cache line demotion instruction upon the counter exceeding a first threshold; and
enable the cache line demotion instruction upon the counter dropping below a second threshold;
wherein an execution of the cache line demotion instruction by one of the plurality of hardware processor cores causes a plurality of unmonitored cache lines in the first cache to be moved to the second cache.

2. The apparatus of claim 1, wherein the first cache is a level 1 cache and the second cache is a level 2 cache.

3. The apparatus of claim 1, wherein the first cache is a mid-level cache and the second cache is a last-level cache.

4. The apparatus of claim 1, wherein the inter-core accesses comprise snoop requests.

5. The apparatus of claim 1, wherein each of the plurality of hardware processor cores includes a decoder to decode the cache line demotion instruction and execution hardware to execute a decoded cache line demotion instruction to move a cache line from the first cache to the second cache.

6. The apparatus of claim 1, wherein the plurality of monitored cache lines in the first cache are randomly selected.

7. A method implemented in a hardware processor, the method comprising:
tracking accesses to a plurality of monitored cache lines in a first cache of the hardware processor; and
controlling enablement of a cache line demotion instruction based on the tracked accesses;
wherein the tracking and controlling further comprises:
storing addresses of a plurality of cache lines in the first cache;
maintaining a counter for tracking a number of intra-core accesses compared to a number of inter-core accesses;
incrementing the counter upon an intra-core access to an address of one of the plurality of monitored cache lines in the first cache;
decrementing the counter upon an inter-core access to an address of one of the plurality of monitored cache lines in the first cache;
disabling the cache line demotion instruction upon the counter exceeding a first threshold; and
enabling the cache line demotion instruction upon the counter dropping below a second threshold;
wherein an execution of the cache line demotion instruction causes a plurality of unmonitored cache lines in the first cache to be moved to a second cache of the hardware processor.

8. The method of claim 7, further comprising:
decoding the cache line demotion instruction;
executing a decoded cache line demotion instruction; and
moving a cache line from the first cache to the second cache.

9. The method of claim 7, further comprising:
randomly selecting the plurality of monitored cache lines in the first cache.

10. An apparatus comprising:
a plurality of hardware processor cores, wherein each of the hardware processor cores includes a first cache;
a second cache, communicatively coupled to and shared by the plurality of hardware processor cores; and
a predictor circuit for tracking accesses to a plurality of monitored cache lines in the first cache and controlling enablement of a cache line demotion instruction based upon the tracked accesses, wherein the predictor circuit is operable to:
store addresses of a plurality of cache lines in the first cache;
maintain a counter for tracking a number of intra-core accesses compared to a number of inter-core accesses;
decrement the counter upon an intra-core access to an address of one of the plurality of monitored cache lines in the first cache;
increment the counter upon an inter-core access to an address of one of the plurality of monitored cache lines in the first cache;
enable the cache line demotion instruction upon the counter exceeding a first threshold; and
disable the cache line demotion instruction upon the counter dropping below a second threshold;
wherein an execution of the cache line demotion instruction by one of the plurality of hardware processor cores causes a plurality of unmonitored cache lines in the first cache to be moved to the second cache.

11. The apparatus of claim 10, wherein the first cache is a level 1 cache and the second cache is a level 2 cache.

12. The apparatus of claim 10, wherein the first cache is a mid-level cache and the second cache is a last-level cache.

13. The apparatus of claim 10, wherein the inter-core accesses comprise snoop requests.

14. The apparatus of claim 10, wherein each of the plurality of hardware processor cores includes a decoder to decode the cache line demotion instruction and execution hardware to execute a decoded cache line demotion instruction to move a cache line from the first cache to the second cache.

15. The apparatus of claim 10, wherein the plurality of monitored cache lines in the first cache are randomly selected.

* * * * *